(12) United States Patent
Valaskovic

(10) Patent No.: US 12,211,684 B2
(45) Date of Patent: Jan. 28, 2025

(54) METHOD AND DEVICE FOR IMPROVED PERFORMANCE WITH MICRO-ELECTROSPRAY IONIZATION

(71) Applicant: NEW OBJECTIVE, INC., Littleton, MA (US)

(72) Inventor: Gary A. Valaskovic, Littleton, MA (US)

(73) Assignee: NEW OBJECTIVE, INC., Littleton, MA (US)

(*) Notice: Subject to any disclaimer, the term of this patent is extended or adjusted under 35 U.S.C. 154(b) by 226 days.

(21) Appl. No.: 17/761,659

(22) PCT Filed: Oct. 29, 2020

(86) PCT No.: PCT/US2020/057859
§ 371 (c)(1),
(2) Date: Mar. 18, 2022

(87) PCT Pub. No.: WO2021/087043
PCT Pub. Date: May 6, 2021

(65) Prior Publication Data
US 2022/0328300 A1    Oct. 13, 2022

Related U.S. Application Data

(60) Provisional application No. 62/928,483, filed on Oct. 31, 2019.

(51) Int. Cl.
*H01J 49/00*  (2006.01)
*G01N 30/72*  (2006.01)
*H01J 49/16*  (2006.01)

(52) U.S. Cl.
CPC ........ *H01J 49/167* (2013.01); *G01N 30/7266* (2013.01)

(58) Field of Classification Search
CPC ..................... H01J 49/167; G01N 30/7266
USPC ......................... 250/281, 282, 288
See application file for complete search history.

(56) References Cited

U.S. PATENT DOCUMENTS

| | | | |
|---|---|---|---|
| 1,958,406 A | 5/1934 | Darrah et al. | |
| 4,483,773 A | 11/1984 | Yang et al. | |
| 4,531,056 A | 7/1985 | Labowsky et al. | |
| 4,765,539 A | 8/1988 | Noakes et al. | |
| 4,776,515 A | 10/1988 | Michalchik et al. | |
| 4,793,920 A | 12/1988 | Cortes et al. | |
| 4,861,988 A * | 8/1989 | Henion ................. | H01J 49/167 250/281 |
| 5,170,053 A | 12/1992 | Hall et al. | |
| 5,306,412 A | 4/1994 | Whitehouse et al. | |
| 5,337,963 A | 8/1994 | Noakes et al. | |

(Continued)

OTHER PUBLICATIONS

Maxwell, et al ("Asymmetrical emitter geometries for increased range of stable electrospray flow rates," Analytical Chemistry 82, 20 (2010) pp. 8377-8381) (Year: 2010).*

(Continued)

*Primary Examiner* — Michael Maskell
(74) *Attorney, Agent, or Firm* — Norris McLaughlin PA

(57) ABSTRACT

Disclosed is an emitter device configured to operate as part of an electrospray ionization mass spectrometry device, the emitter device providing droplets of a liquid containing material to be analyzed. Also disclosed are methods of use of the emitter device 1.

13 Claims, 19 Drawing Sheets

(56) References Cited

U.S. PATENT DOCUMENTS

| | | |
|---|---|---|
| 5,412,208 A | 5/1995 | Covey et al. |
| 5,572,023 A | 11/1996 | Caprioli |
| 5,608,217 A | 3/1997 | Franzen et al. |
| 5,750,988 A | 5/1998 | Apffel et al. |
| 5,788,166 A | 8/1998 | Valaskovic et al. |
| 5,868,322 A | 2/1999 | Loucks, Jr. et al. |
| 5,927,618 A | 7/1999 | Jefferies et al. |
| 5,975,426 A | 11/1999 | Myers |
| 5,997,746 A | 12/1999 | Valaskovic |
| 6,079,634 A | 6/2000 | Noakes et al. |
| 6,147,345 A | 11/2000 | Willoughby |
| 6,177,669 B1 | 1/2001 | Wells et al. |
| 6,190,559 B1 * | 2/2001 | Valaskovic .......... B01D 15/206 95/82 |
| 6,207,955 B1 | 3/2001 | Wells et al. |
| 6,326,616 B1 | 12/2001 | Andrien, Jr. et al. |
| 6,481,648 B1 | 11/2002 | Zimmermann |
| 6,525,313 B1 | 2/2003 | Park |
| 6,573,494 B1 | 6/2003 | Andrien, Jr. et al. |
| 6,759,650 B2 | 7/2004 | Covey et al. |
| 7,015,466 B2 | 3/2006 | Takats et al. |
| 7,087,894 B2 | 8/2006 | Liu et al. |
| 7,145,136 B2 | 12/2006 | Yang et al. |
| 7,364,913 B2 | 4/2008 | Andrien, Jr. et al. |
| 7,391,020 B2 | 6/2008 | Bousse et al. |
| 7,816,645 B2 | 10/2010 | Kelly et al. |
| 8,153,992 B2 | 4/2012 | Horiike et al. |
| 8,272,576 B2 | 9/2012 | Doak et al. |
| 9,289,787 B2 | 3/2016 | Doak et al. |
| 9,502,227 B2 | 11/2016 | Masujima et al. |
| 9,793,477 B2 | 10/2017 | Wang et al. |
| 2011/0042216 A1 | 2/2011 | Maxwell et al. |
| 2012/0085900 A1 | 4/2012 | Verbeck |
| 2017/0151578 A1 | 6/2017 | Morad et al. |
| 2017/0316926 A1 | 11/2017 | Arnold et al. |
| 2019/0378704 A1 | 12/2019 | Bachus et al. |

OTHER PUBLICATIONS

Chang, et al.; "Sheathless Capillary Electrophoresis/Electrospray Mass Spectometry Using a Carbon-coated Tapered Fused-silica Capillary with a Beveled Edge", Anal. Chem., 2001, 73, pp. 5083-5087.

Chen, et al.; "Design and performance of a low-flow capillary electrophoresis mass spectrometry interface using an emitter with dual bevel edge", Electrophoresis, 2005, 26, pp. 1376-1382.

Covey, et al.; "Atmospheric Pressure Ion Sources", Mass Spectrom. Rev., 2009, 28, pp. 870-897.

Kottke et. al; "Drill: An Electrospray Ionization-Mass Spectrometry Interface for Improved Sensitivity via Inertial Droplet Sorting and Electrohydrodynamic Focusing in a Swirling Flow", Anal. Chem., 2017, 89, pp. 8981-8987.

Maxwell, et al.; "Asymmetrical Emitter Geometries for Increased Range of Stable Electrospray Flow Rates" Anal. Chem., 2010, 82, pp. 8377-8381.

Covey, et al.; "Nanospray Electrospray Ionization Development", Chapter 2 from the book: Pramanik, Ganguly, Gross, eds. Applied Electrospray Mass Spectroemtry: Practical Spectroscopy Series, vol. 32. CRC Press, 2002, pp. 127-128.

Reschke, Timperman; "A Study of Electrospray Ionization Emitters with Differing Geometries with Respect to Flow Rate and Electrospray Voltage", J. Am. Soc. Mass Spectrom, 2011, 22, pp. 2115-2124.

Tseng, et al.; "A low-makeup Beveled Tip Capillary Electrophoresis/ Electrospray Ionization Mass Spectrometry Interface", Anal. Chem., 2004, 76, p. 6306-6312.

Tycova, et al.; "Interface-free capillary eletrophoresis-mass spectrometry system with nanospray ionization—Analysis of dexazoxane in blood plasma", J. Chromatography A, 2016, 1466, pp. 173-179.

* cited by examiner

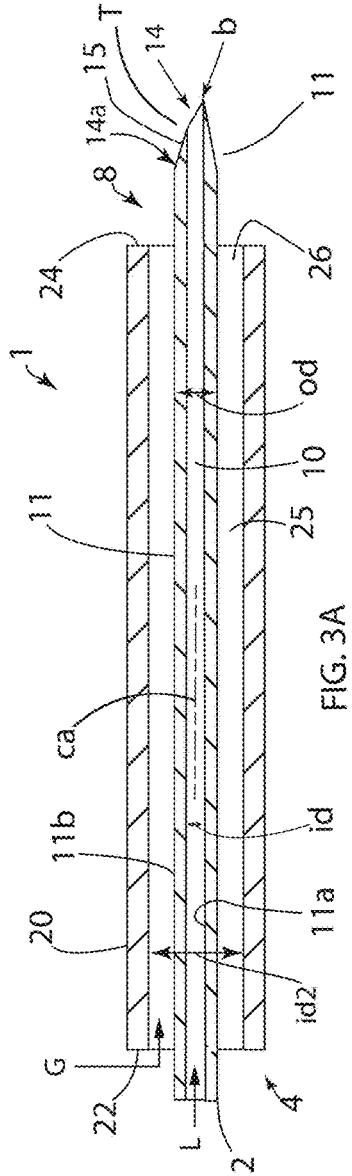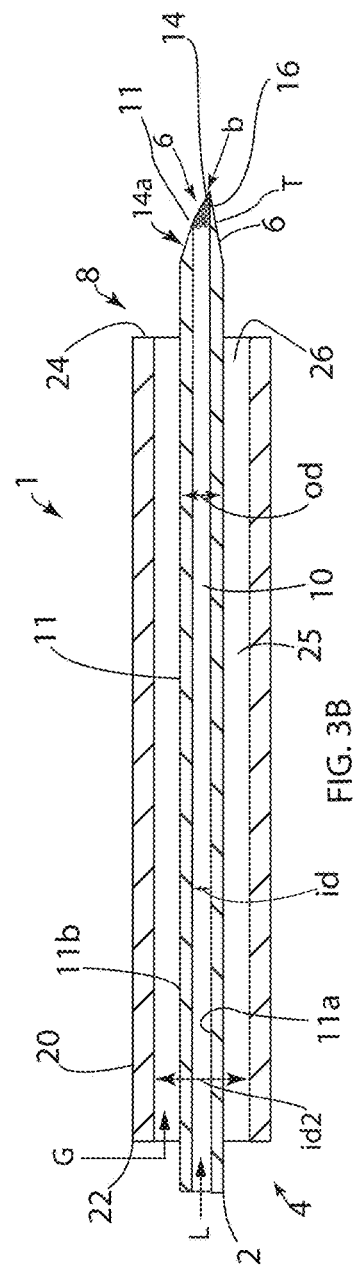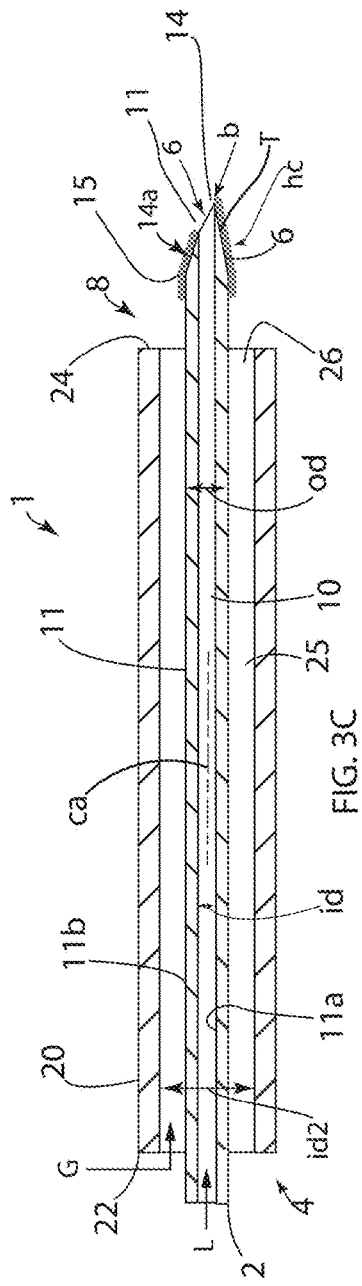

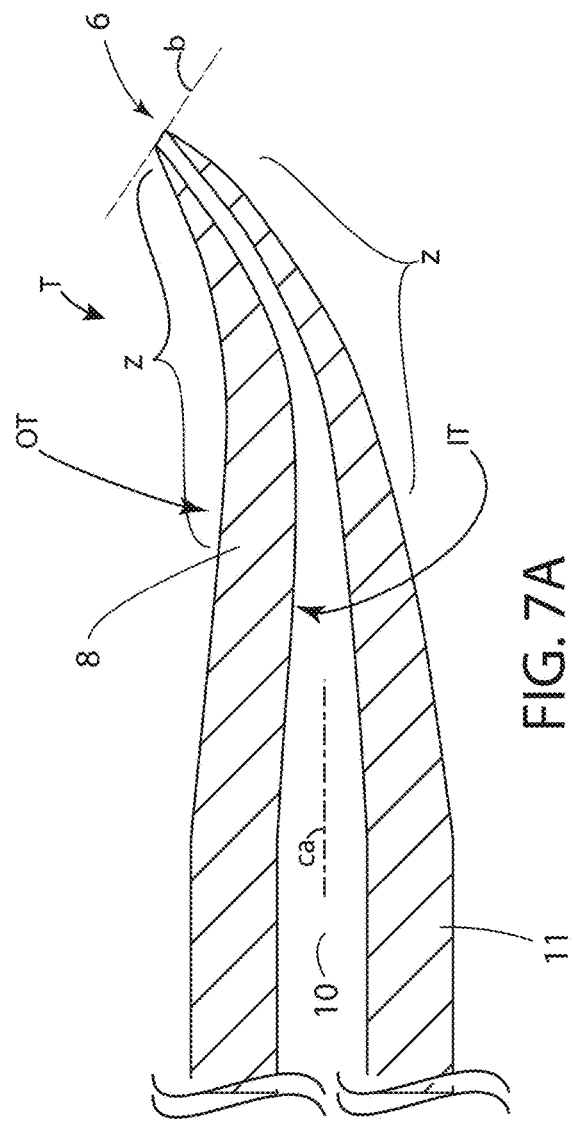
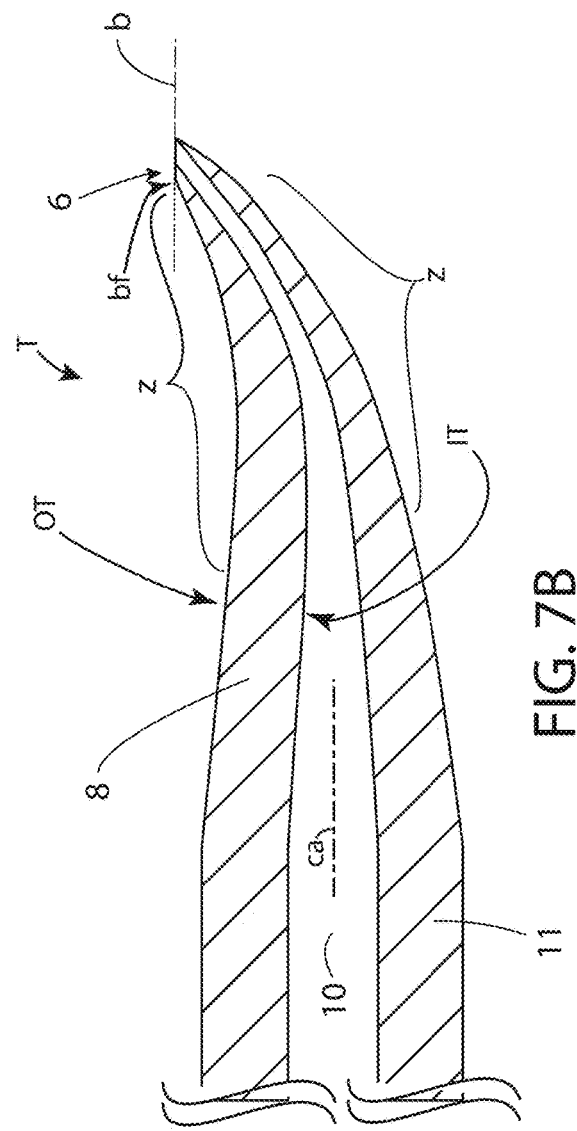
FIG. 7A
FIG. 7B

METHOD AND DEVICE FOR IMPROVED PERFORMANCE WITH MICRO-ELECTROSPRAY IONIZATION

This is an application filed under 35 USC 371 based on PCT/US2020/057859, filed 29 Oct. 2020 which claimed priority to U.S. Ser. No. 62/928,483, filed 31 Oct. 2019. The present application claims the full priority benefit of all prior applications and incorporates by reference their full disclosures as if set forth herein.

The present invention relates to a method and device providing improved performance of micro-electrospray ionization.

Electrospray is a key atmospheric pressure ionization method used in combination with mass spectrometry for the chemical analysis of a wide variety of small and large molecules, commonly referred to as an "analyte", which may be provided with carrier material such as a liquid solvent of known composition.

Various embodiments of the electrospray method and device have been developed since the original discovery and development of the method by Fenn and co-workers; see U.S. Pat. Nos. 4,531,056, and 5,306,412.

Certain improvements to the methods and device of electrospray ionization (also referred to as "ESI") mass spectrometry include those relating to the effective operating flow rate of liquid sample through the ESI nozzle and source. The transition of a sample's bulk liquid to the gas phase is enabled by the combination of a two-step process. The electrically charged liquid is broken up into a plume of small droplets by the flow of high velocity sheath gas. Solvent evaporation in the charged droplets then takes place and the electrically charged sample is ionized. Thus, this method of ESI is often called "sheath gas assisted" because the high velocity flow of coaxial sheath gas assists droplet formation as the liquid stream breaks up into droplets. For example, U.S. Pat. No. 4,861,988 discloses the use of a co-axial pneumatic "sheath gas" nebulization to enable the operation of the ESI nozzle at flow rates higher, which are higher than those disclosed in U.S. Pat. No. 4,531,056. Further developments relating to pneumatic sheath gas nebulization and operation at higher flow rates, are described in U.S. Pat. Nos. 4,861,988, 5,170,053, 5,412,208, and 5,868,322 to operate at even higher flow rates. While operation at higher flow rates, i.e., up to the milliliter-per-minute regime, does not offer the highest sensitivity and ionization efficiency for ESI, it does confer a high level of ruggedness and ease of operation to the use of the device.

Various device and methods for modifying methods the operational behavior of sheath gas assisted ESI by the addition of further gas flows or flow gradients have been described in the art, certain of which are described in U.S. Pat. Nos. 5,412,208, 6,177,669, 6,207,955, and 6,759,650.

Many have described modifications to the nanospray emitter geometry (shape, emitter diameter) itself. Noakes et al. (U.S. Pat. No. 4,765,539) and Jeffries et al. (U.S. Pat. No. 5,927,618) suggested the benefits of using a beveled nozzle designs for electrohydrodynamic spraying. A planar bevel at the end of the nozzle was observed to direct the direction of the spray along the central axis of the bevel. That is, the emission of the Taylor cone-jet typically follows the direction along the apex formed between the end of the bevel and the side of the tapered nozzle. Beveled nozzles were later proven to be useful for ESI-MS by Her and colleagues in either a single- (Anal. Chem. 2004, 76, 6306-6312) or dual-bevel (Electrophoresis 2005, 26, 1376-1382) design. Her and colleagues demonstrated that the bevel enables stable ESI-MS signal at a flow rate lower than expected (Anal. Chem. 2010, 82, 8377-8381) for a large diameter emitter (as also characterized by Timperman (2011)). In agreement with the previous prior art by Jeffries, Her observed that the Taylor cone emission direction is associated with, and emanates from, the apex of the bevel in a direction that approximates the central axis of the bevel angle. The Taylor cone is physically supported by the beveled end, enabling the cone-jet stability at flow rates lower than that enabled by the inside diameter of the nozzle. These examples of prior art teach that beveled nozzles have advantages to operate across a lower flow rates that the earlier square or plain-tapered nozzle designs. They do not teach that it is how have a Taylor-cone jet direction that is substantially asymmetrical to the central axis, improved droplet sizes in the plume of droplets, nor do they teach or suggest that a beveled style emitter can increase the optimal flow rate above 1 µL/min.

At the same time, work has been undertaken to substantially lower the operating flow rate of ESI down to the nanoliter-per-minute regime; such are described in U.S. Pat. Nos. 5,608,217, 5,788,166. Ultra-low flow rate ESI has been generally adopted by those practicing the art, and is known generically by the term "nanospray". Nanospray is considered to be a theoretically "pure" form of ESI in which the ESI nozzle is miniaturized to the micrometer scale. Nebulization gas is thus not required, nor is it considered desirable, in this form of ESI. Nanospray is also widely considered by those skilled in the art to offer the highest effective sensitivity for mass spectrometry. Nanospray combined with mass spectrometry enables the analysis of minute samples and confers the highest fundamental ionization efficiency, as is described in U.S. Pat. No. 5,608,217.

However, in contrast to sheath gas assisted ESI, the initial break-up of the liquid into droplets with nanospray is completely governed and generated by electrostatic repulsion generated by a high voltage applied to the nanospray nozzle. This process generally produces smaller initial droplet sizes than sheath gas assisted ESI, thereby providing a more direct and efficient route to liquid sample ionization. Unfortunately, the nanospray process is generally limited to liquid flow rates of approx. 1 µL/min or less. Between the high flow and nanospray variants, ESI offers effective ionization for mass spectrometry ("MS") for liquid flow rates covering some six plus orders of magnitude. Such an advantage has made ESI the ionization method of choice in coupling to various forms of liquid phase separations by liquid chromatography (also referred to as "LC"). Generally nanospray is used in conjunction with a miniaturized nanobore (≤100 µm diameter) LC to mass spectrometry, while sheath gas assisted ESI is used in conjunction with large bore (≥2 mm diameter) LC to mass spectrometry.

The current trend in chemical analysis by mass spectrometry is directed towards the analysis of smaller sample volumes (≤100 uL) separated by small volume LC prior to analysis by MS. The analytical desire is for all analysis to have the sensitivity and ionization efficiency of nanospray, with ease of use and ruggedness of high flow operation. While the prior art discloses various LC and MS techniques, the art fails to satisfy this trend and a growing need for the analysis of smaller sample volumes (≤100 uL) separated by small volume LC prior to analysis by MS. Thus, there exists a real and need for new form of ESI and methods of use which provides both the sensitivity of nanospray, with the desired attributes of operation at higher flow rates, i.e., ≥1 microliters/minute (≥1 µl/min). It is to such a need, and further other needs in the art, that the present invention is directed.

FIG. 3A depicts an embodiment of emitter device of the invention.

FIG. 3B depicts a further embodiment of an emitter device of the invention.

FIG. 3C depicts a still further embodiment of an emitter device of the invention.

FIG. 7A depicts an embodiment of an emitter device of the invention, having a microbend near its outlet end, viz., its tip, but no flat bevel faced orifice, in accordance with the invention.

FIG. 7B depicts an embodiment of an emitter device of the invention, having a microbend near its outlet, viz, its tip and also comprising a flat bevel faced orifice, in accordance with the invention.

Figure 12:
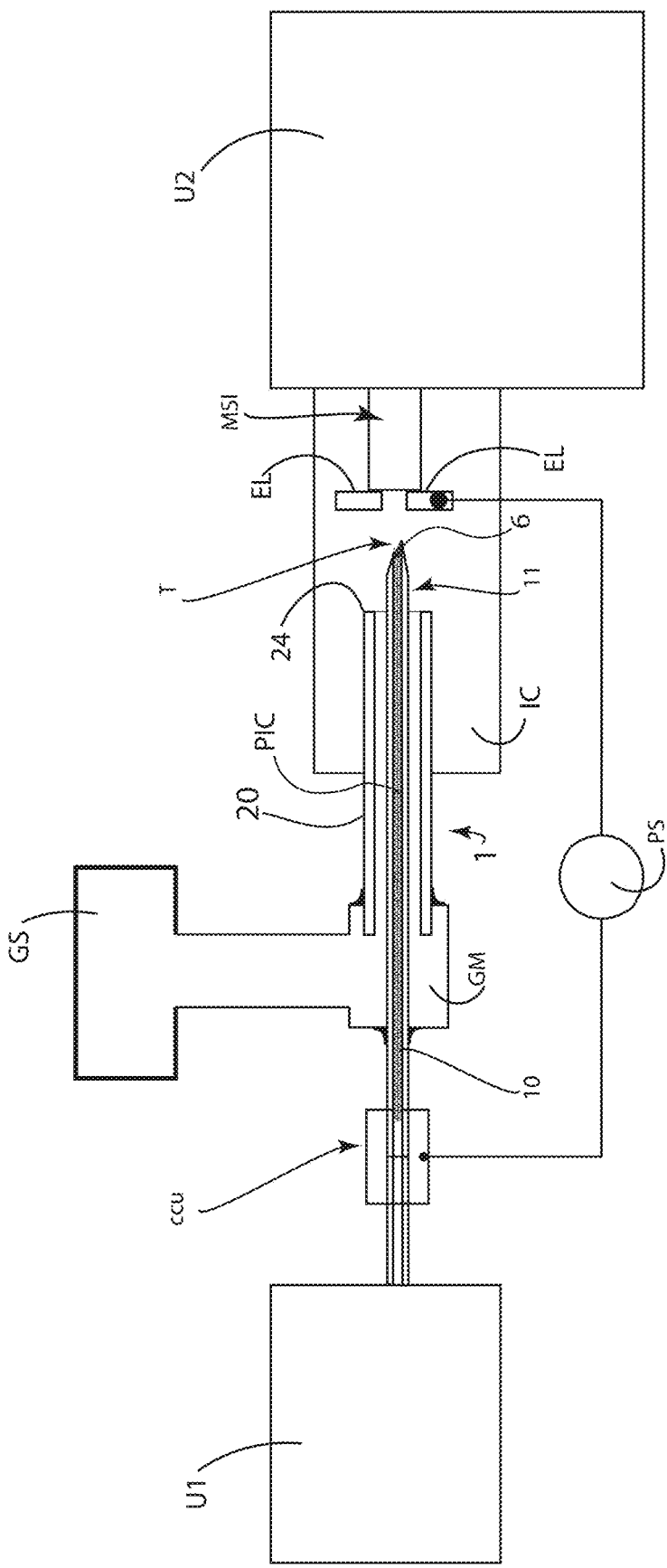

FIG. 12 schematically depicts a preferred embodiment of an emitter device of the invention, coupled to an atmospheric pressure inlet mass spectrometry device.

Figure 13A:
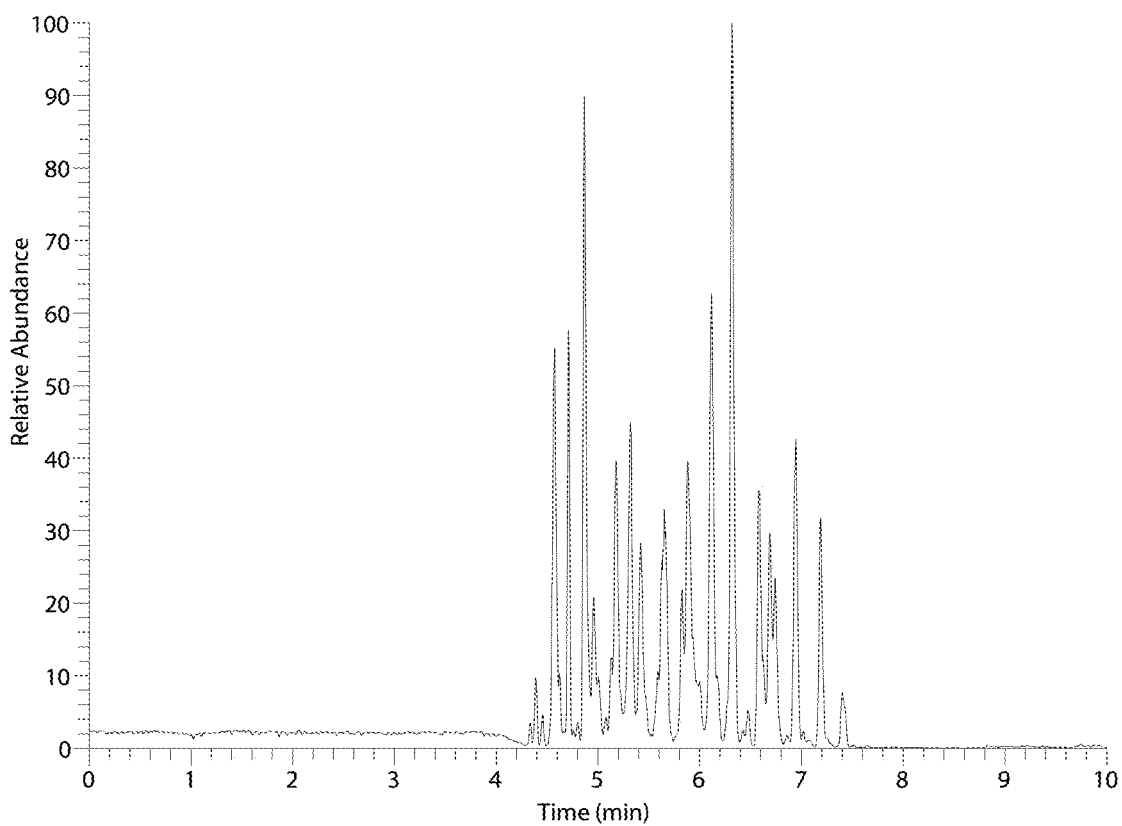

FIG. 13A illustrates a reconstructed base peak chromatogram of an analyte.

Figure 13B:
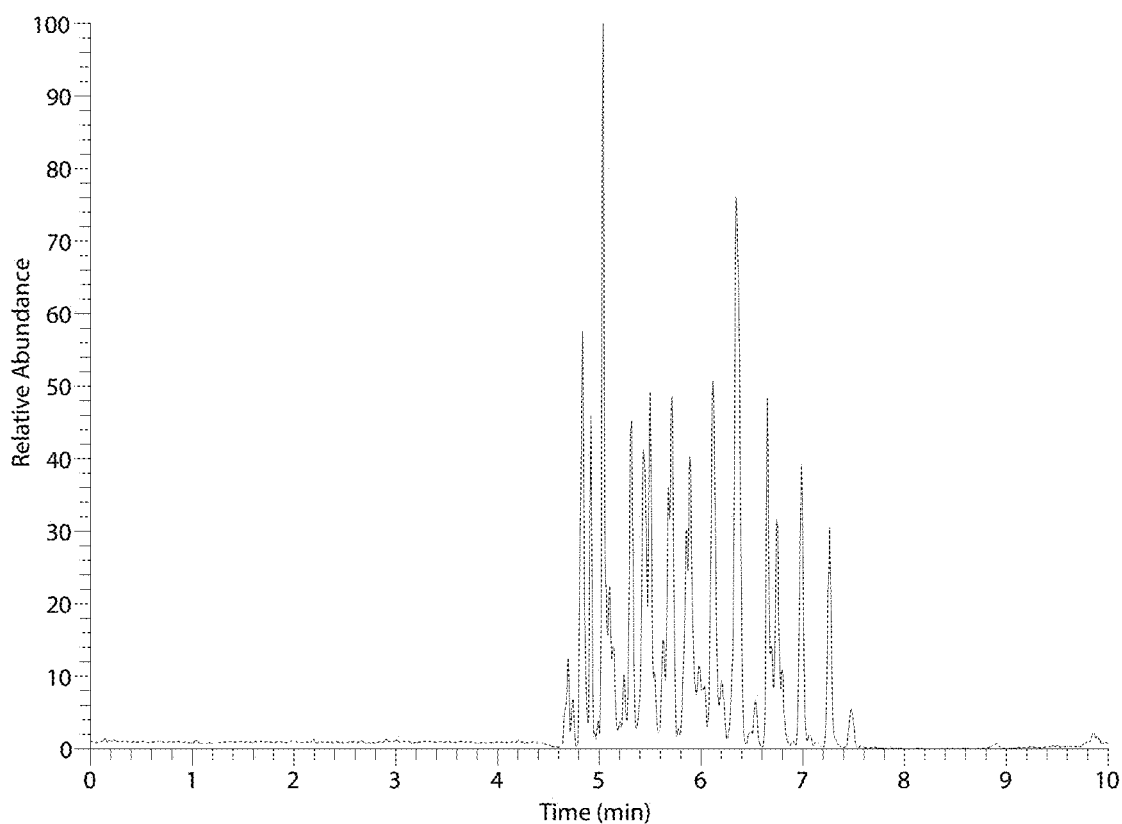

FIG. 13B illustrates a further reconstructed base peak chromatogram of an analyte.

In a broad aspect the present invention relates to a novel ESI emitter device, and methods for use, which provide one or more of the benefits of ultra-low flow rate ESI ("nanospray") but which maybe be used with higher flow rates, i.e., ≥1 microliters/minute (≥1 µl/min).

In a further broad aspect the present invention relates to improved processes for the chemical analysis of a wide variety of small and large molecules, viz., an "analyte", which process utilizes the novel ESI device, which maybe be used in the analysis of said molecules, at comparable, but preferably at higher flow rates than conventionally used with prior art, ultra-low flow rate ESI ("nanospray") device and methods.

In preferred aspects, the present invention addresses and balances the need for analytical sensitivity of analytes with the ruggedness afforded by higher flow ESI. In an aspect, the emitter device according to the present invention enables the efficient ionization and operation of ESI at flow rates intermediate to that of nanospray and higher-flow ESI methods. Defining this regime as microspray ionization, the inventive emitter device may operate at flow rates of the analyte of from about 1 µL/min to 100 µL/min, preferably from about 5 µL/min to 100 µL/min and still more preferably at flow rates of from about 10 µL/min to 100 µL/min of the analyte, thus rendering the device of the invention compatible with so-called microflow LC columns, i.e., those having an inner diameter in the range of from 100 µm to 1 mm, preferably from 100 µm to 0.5 mm inside diameter, and related analytical methods used therewith.

A feature of preferred aspects of the present invention addresses and overcomes certain deficiencies in the prior art, which lacks any teaching or suggestion as to achieving the optimized operation of nebulization gas and the effluent of liquid from the ESI nozzle so that the droplets emitted from the outlet are directed towards the highest velocity region of the sheath gas passing through the ESI device. The device and methods of adding additional gas flows or flow gradients disclosed in U.S. Pat. Nos. 5,412,208, 6,177,669, 6,207,955, and 6,759,650 operate differently than the instant invention, and add significant complexity. The present invention overcomes these shortcomings of the prior art device and methods.

In preferred embodiments, of the ESI emitter device of the invention and methods of use provide the ability to direct the primary electrostatic nebulization towards the highest velocity section of the pneumatic sheath gas flow which flow from the emitter device in the direction of its outlet at a tip, while concurrently ensuring that the emitter device of the invention and methods for its use are directly compatible with well-established atmospheric pressure MS interface device (s). Hence in a further feature, the invention includes the use of the inventive emitter device in conventional methods used in determining analyte compositions, including but not limited to otherwise conventional MS methods and with otherwise conventional MS device within which the ESI emitter device of the invention is used. The inventive emitter device may also be used with a broad range of chemical analysis methods and apparatus, as it is suitable for the ionization of practically any ionic species present in a chemical solution or within a carrier liquid, whether the ion is positively or negatively charged. The inventive device is particularly well suited for the ionization of species composed of organic chemical compounds (viz., "analytes") including, but not limited to: small and large organic molecules, as well as pharmaceutical compounds, and their biological metabolites. The inventive device is also particularly well suited for the ionization of bio-molecules (viz, "analytes") including, but not limited to, amino acids, peptides, proteins, oligonucelotides, lipids, fats, and the biological metabolites of said chemical species. The inventive device is suitable for the analysis of biological fluids (viz, "analytes") including, but not limited to, whole blood, blood plasma, blood serum, urine, saliva, tears, spinal fluid, bile.

In certain of the preferred embodiments, the invention also provides methods for the optimization for liquid atomization and liquid analyte ionization. The invention proves the methods for providing highly optimized electrospray ionization in the context for the atomization and ionization of liquid samples (i.e, analytes) preferably delivered by a liquid chromatography system which provides for the separation of complex chemical mixtures. In the preferred embodiments the ions generated by the invention are analyzed by the technique of atmospheric pressure inlet mass spectrometry (hereinafter, "API-MS"). As can be surmised from the non-limiting embodiment of an aspect of and API-MS system and apparatus which includes the inventive emitter device which is schematically depicted in FIG. 12, the inventive emitter device and method of the invention advantageously provides of a coupling of liquid chromatography ("LC") to API-MS to yield a system for optimized liquid chromatography-mass spectrometry (hereinafter, "LC-MS"), which prior to the present invention, was simply unknown. Thus, in a further aspect the present invention provides for an apparatus, system and method for optimized liquid chromatography-mass spectrometry which includes at least one of the inventive emitter devices described herein.

Figure 1A:
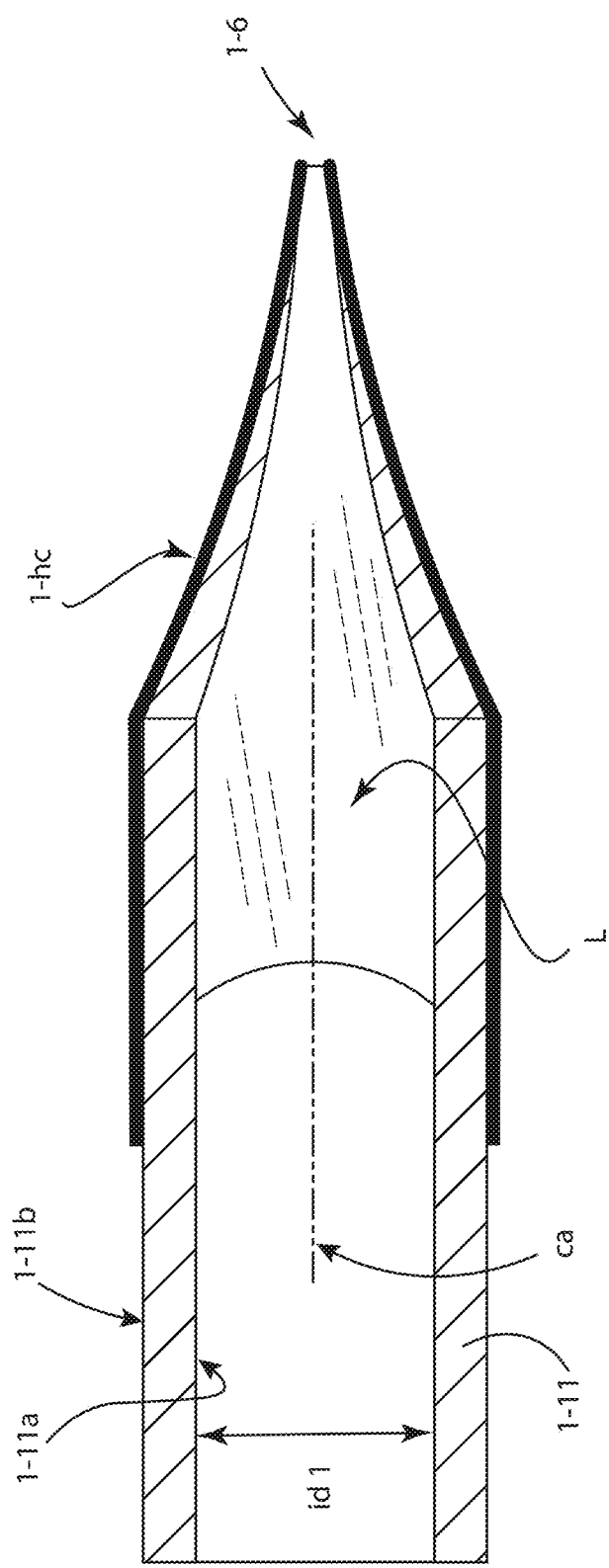
FIG. 1A depicts a first prior art ESI emitter device in a cross sectional view.
Figure 1B:
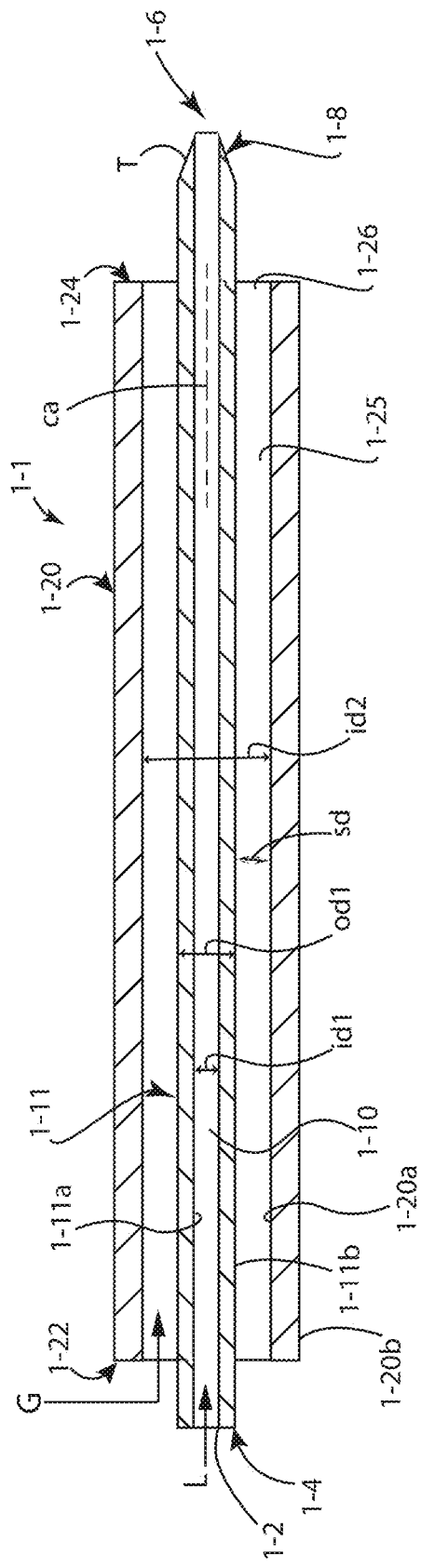
FIG. 1B depicts a second prior art ESI emitter device, in a cross sectional view.
Figure 2:
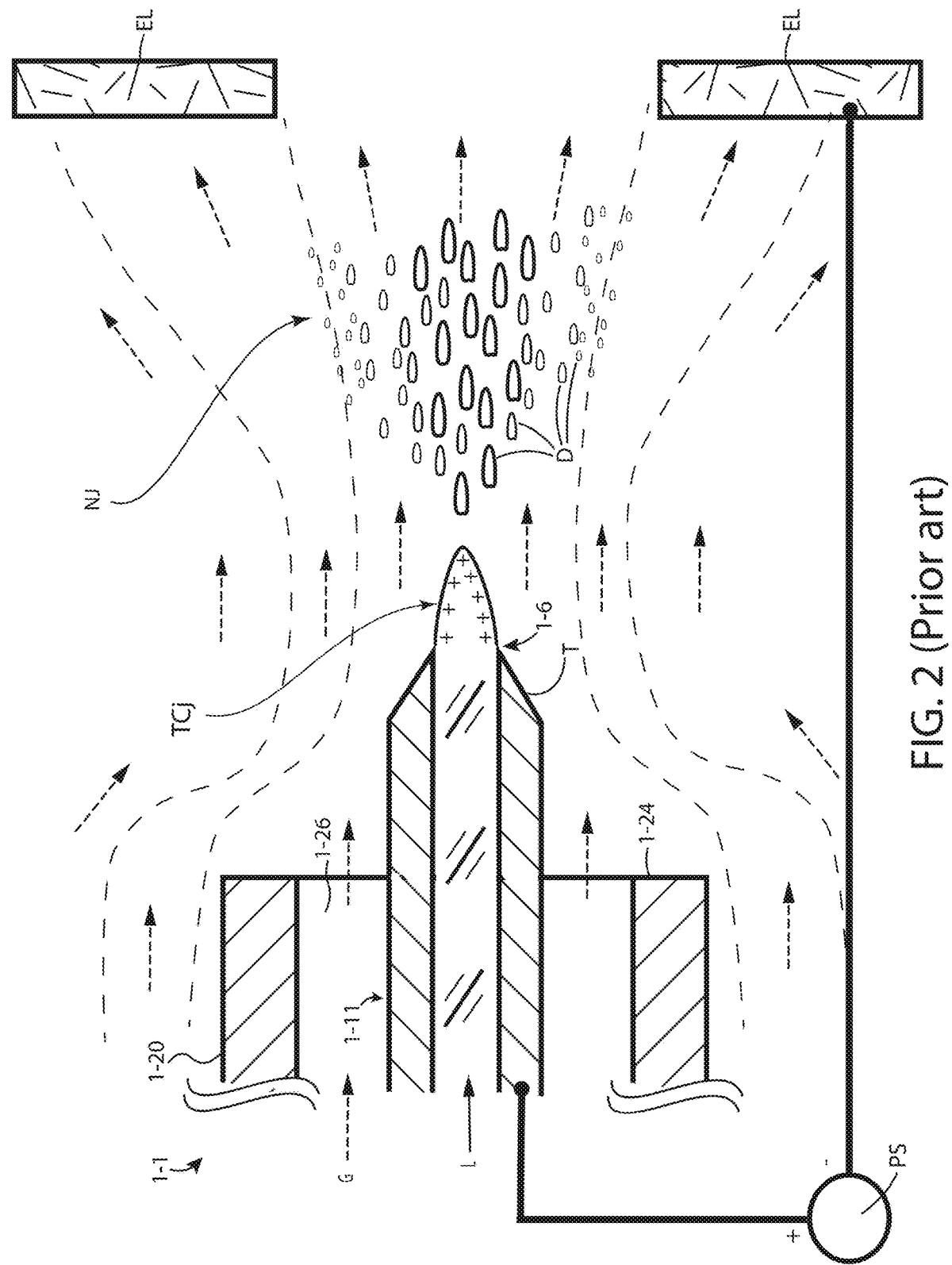
FIG. 2 depicts a detail of the ESI emitter device of FIG. 1A, and resultant flow of fluid delivered therefrom illustrating the symmetric droplet plume.

The inventive emitter device 1 of the current invention may be understood and contrasted with prior art ESI device, as illustrated and described on FIG. 1A, FIG. 1B and FIG. 2.

FIGS. 1A and 1B separately depict in a cross-sectional view a prior art ESI device 1-1 having a tubular emitter 1-11 configured for electrospray ionization, further having an inlet 1-2 at its distal end 1-4, and a concentric tapered outlet 1-6 at the end of a tip T at a proximal end 1-8 of the emitter 1-11. The emitter 1-11 includes a continuous inner bore 1-10 extending between its distal end 1-4 and its proximal end 1-8; the emitter 1-11 also having an inner wall 1-11*a* and an outer wall 1-11*b*, which may be used to define an inner diameter id1 and outer diameter od1 of the tubular emitter 1-11. Inherently the tubular emitter 1-11 defines a center axis "ca" about which it is concentric. The prior art ESI devices of FIGS. 1 and 1A further comprise a larger diameter, second tube 3-20 also concentric with ca of emitter 1-11. The second tube 1-20 has a proximal end 1-22, a distal end 1-24. The second tube 1-20 is a sheath gas tube, and has a inner diameter id2 greater than od1 of the tubular emitter 1-11. The inner diameter id2 of the second tube 1-20 is typically within 0.05 to 2 mm greater than the outside diameter od1 of the tubular emitter 1-11, preferably is between 0.15 to 1 mm. Alternately the shortest distance between outer wall 1-11*b* of the tubular emitter 1-11 and the inner wall 1-20*a* and the outer wall 1-11*b* is between 0.025 and 1 mm, preferably between 0.05 to 0.1 mm, as is represented by indicated line "sd" in FIG. 1. The proximal end 3-8 of the tubular emitter 1-11, and the tip T is preferably configured to protrude or extend beyond the proximal end 1-24 of the second tube 1-20 (sheath gas tube) such that the outlet 1-6 is typically between 0.1 mm to 5 mm; the outlet is generally planar and perpendicular to ca, and terminates the tip T. When operating, a liquid sample comprising an analyte is introduced (i.e., by a pump, or other suitable means) into the inlet 1-2 at the distal end 1-4 of the tubular emitter 1-11. The emitter 1-11 also carries either a positive or negative charge, which is provided by a suitable power source (with the opposing charge present on a counter electrode "EL" positioned downstream and external to the tip T.) A pressurized flow of gas is concurrently provided (i.e., by a pump, or other suitable means) to the distal end 1-22 of the second tube 1-20. The pressurized gas flows through the space 1-25 between the tubular emitter 1-11 and second tube 3-20. The gas exits via a proximal end outlet 3-26 of the second tube 1-20, which may be interchangeably referred to as the sheath gas tube.

Egress of a spray of droplets of a liquid from within the tubular emitter 1-11 is described with reference to FIG. 2 which depicts a proximal end of the prior art ESI device 3-1 of FIG. 1 and/or FIG. 1A. Turning now to FIG. 2, therein is depicted a detail of the ESI emitter device of FIG. 1 and/or FIG. 1A, including the resultant flow of fluid delivered therefrom illustrating the symmetric droplet plume provided which is essentially symmetrical about the center axis of the tubular emitter 1-11.

In accordance with the invention there is provided a uniquely shaped and constructed ESI emitter device that is advantageously used in a manner for gas flow or pneumatically assisted electrospray, in a manner not known from the prior art. Such is provided by the novel ESI emitter device described herein and depicted in various of the further drawing figures. The performance of the invention is surprisingly superior to those of the prior art (i.e., as described in FIGS. 1, 1A and 2), and overcome performance deficiencies in the balance between high sensitivity and low-flow rate performance in current analytical methods. As can be understood and appreciated from the results reported in FIGS. 10B, 10C, 10D, 11B, 11C, 11D, 13A and 13B emitter devices of the invention provide higher flow rate operation than currently known nanospray ionization methods, which are typical of gas flow or pneumatically assisted ESI having prior art types of emitters, while at the same time preserving the high sensitivity analysis of nanospray ionization.

In an aspect, the invention provides this performance advantage by directing the electrostatically charged droplets emitted from "Taylor cone-jet region" formed at the outlet and tip of the novel ESI emitter device towards the highest velocity region of nebulization gas, known in the art as the "nebulizer jet region".

As in the foregoing FIGS. 1A, 1B and 2, similarly in following drawing figures, like elements are described with common numerals, letters or combinations thereof.

A preferred embodiment of a novel ESI emitter device 1 is described with reference to FIG. 3A, FIG. 3B and FIG. 3C. Therein are illustrated, each in a cross-sectional view, different embodiments of a novel emitter device 1 of the invention configured for electrospray ionization.

Figure 6C:
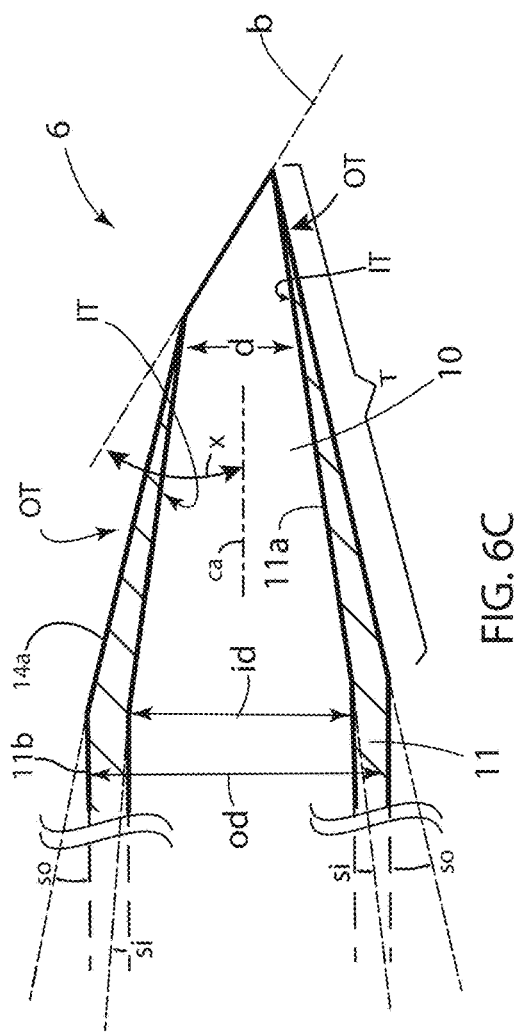
FIG. 6C depicts a detail of an outlet of a further tubular emitter at its in a transverse, cross sectional view, according to the invention.

The emitter device 1 comprises a tubular emitter 11 having an inlet 2 at its distal end 4, and an a nozzle-like, specially shaped and/or tapered outlet 6 present in a tip T at a proximal end 8. When operating, a liquid sample is introduced, such as an analyte or an analyte in a carrier fluid (i.e., using a pump, or other suitable means) into the inlet 2 at the distal end 4. The tubular emitter 11 most of which has a tubular cross-section, has a continuous inner bore 10 extending between the distal end 4 and a proximal end 8 where it terminates at an outlet 6 (orifice). The emitter 11 has an inner wall 11a and an outer wall 11b respectively having an inner diameter "id" and an outer diameter "od" each of which are typically concentric around a common centered (cylindrical) axis "ca" of the bore 10. The depiction is nonetheless to be understood as being a preferred configuration or geometry, but is not limiting as different configurations and geometries may be also used, although not expressly illustrated herein but which does not depart from the principle of the invention. In one preferred embodiment, the emitter 11 is at least in part fabricated using an electrically conductive material such as a metal (i.e., stainless steel alloy, platinum, nickel, etc.) or from a conductive polymer (i.e., carbon loaded PEEK or polyimide) but any conductive material which may be formed into the desired shape may also be used. In an alternate embodiment the emitter 11 is at least in part fabricated using a non-conductive material (e.g. a polymer such as PEEK, fused-silica or glass-) having an electrically conductive coating applied to its outer surface and preferably also, the proximal end 8. Also, tubes of non-conductive materials may alternatively be used by making electrical contact directly to the liquid within the bore 10 via a conductive element placed and established, upstream of the emitter 11, through a separate electrically conductive element that is in direct contact with the liquid. The distal end 4 of the emitter 11 maybe square cut, i.e., perpendicularly and transversely to the central axis ca and manufactured of polished tubing. In any event, an electrical voltage (advantageously between 1 to 5 kilovolts, positive or negative) is applied and makes contact with the liquid flow transiting through the bore 10 of the emitter 11. The inside diameter id of the emitter 11 may be non-tapered as it extends toward the proximal end and tip T thereof so that the inside diameter id of the tube is of a constant diameter as it extends to its outlet 6 at the tip T, as can be seen from FIGS. 6A and 6B, of which FIG. 6A illustrates a transverse view of the outlet 6 shown in top view in FIG. 6B. Alternatively, the inside diameter id of the bore 10 of the tubular emitter 11 may also be tapered within the tip T proximal end thereof so that the inside diameter id of the bore 10 of the tubular emitter 11 is reduced as it extends to its outlet 6; such may be better observed with reference to the detailed views provided on FIGS. 6C and 6D of which FIG. 6C is a transverse view of the outlet 6 shown in the top view of FIG. 6D, with the outlet also being illustrated on FIG. 3A, FIG. 3B and FIG. 3C.

The tubular emitter 11 may be hollow, but advantageously the bore 10 at least partially filled with a particulate packing material which may or may be used to control the flow rate of liquid passing through the bore 10. Exemplary such packing materials include a variety of well-known materials in the art of liquid chromatography or chemical affinity that include, but are not limited to, silica or polymer particles. Said particles are usually either solid or porous in nature and often have a chemical, typically organic or biomolecule, coating applied to offer particular chemical selectivity to improve the quality of the chemical separation. Particles are typically spherical having a diameter typically between the range of 0.5 μm and 20 μm, and particularly preferable in the range of 1 to 5 μm. For porous particles the pore size is typically in the range of 10 to 1,000 nm, and preferably in the range of 6 to 30 nm. Chemical coatings include, but are not limited to, a variety of coatings having hydrophobic (known commercially as C4, C8, C18), hydrophilic, polar, or ionic characteristics such as short and long chain hydrocarbons, amines, alcohols, peptides, proteins. Biomolecule coatings are typically used in so-called "affinity" separation and isolation techniques. All LC separation modes (reverse phase, normal phase, hydrophobic interaction layer, ion-pairing, affinity, ion) that have been demonstrated with LC-ESI-MS are likely to be compatible with and improved by the inventive technique.

Alternatively the bore 10 of the tubular emitter 11 may be at least partially filled with a chemically synthesized cast-in-place porous separation matrix known to those skilled in the art of liquid chromatography as monolithic column technology. For example, said monoliths may be synthesized from silica or polymer materials including silica, styrene, divinyl benzene, and related chemicals and derivatives.

The outside diameter od of tubular emitter 11 may be as much as 1 cm, but is preferably not more than 0.25 cm, more preferably not more than 1000 μm, yet more preferably not more than 500 μm, and particularly preferably not more than about 400 μm. The inside diameter id of the tubular emitter 11 not forming part of the tip is preferably typically between 5 μm to 2 mm; more preferably between of 20 μm to 1 mm and even more preferably between of 20 μm to 500 μm, and particularly preferably the inside diameter of tubular emitter 11 is between of 20 μm to 150 μm. The inside diameter id of the tubular emitter 11 within the tip T at its proximal end may be the same as the id as that not forming part of the tip T, as is represented in FIGS. 6A, 6B.

Figure 6D:
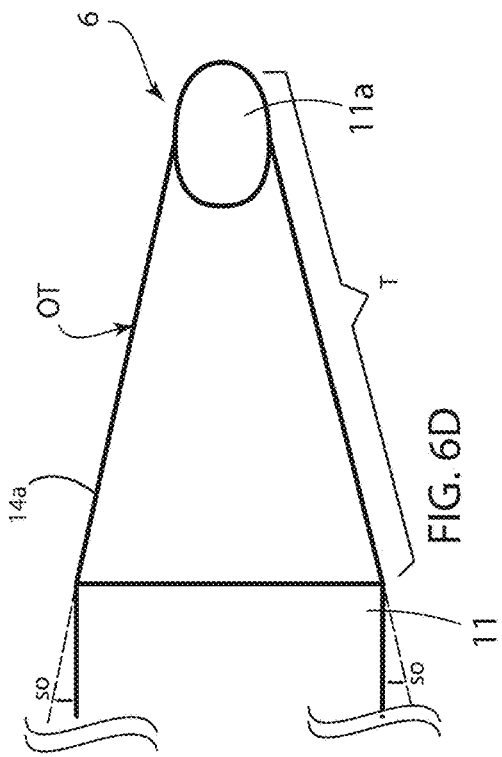
FIG. 6D depicts a top view of the outlet and tubular emitter tip shown in FIG. 6C.
Figure 6A:
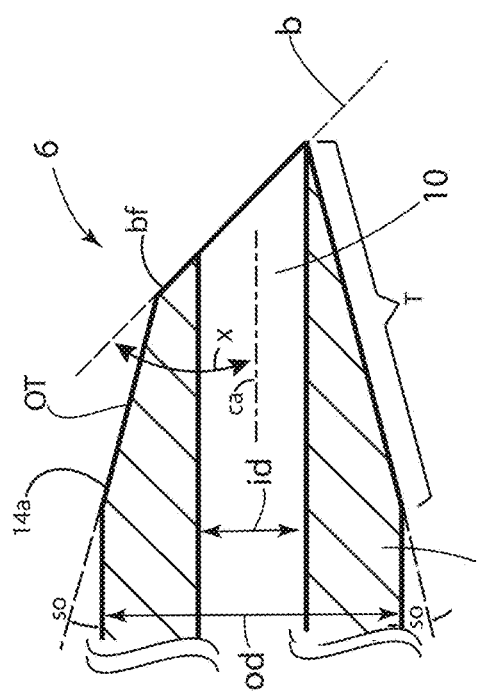
FIG. 6A depicts a detail of an outlet of a tubular emitter at its tip in a transverse, cross sectional view, according to the invention.

Alternately when the tip T includes an outer taper "OT" and an inner taper "IT" within the tip T, as is illustrated on FIGS. 6C, 6D, the inside diameter id of the tubular emitter 11 within the tip T reduces as it extends to the outlet 6, to a reduced diameter "d" as is shown on FIG. 6C. Further in this embodiment the tip T is generally conical an concentric about the center axis ca and has an inner tapered wall IT, angled at an angle "SO" relative to the outer wall 11b, and an outer tapered wall OT, angled at an angle "SI" relative to the outer wall 11b. These angles SO, SI are better understood from FIG. 6C. The angle SO is typically from 5 to 60 degrees, preferably from 10 to 25 degrees, whereas the angle SI is typically from 2 to 50 degrees, preferably from 8 to 20 degrees. It is also to be noted that as outer wall 11b is concentric with the center axis ca, that the respective angles SO, SI are the same relative to ca as well.

Figure 6B:
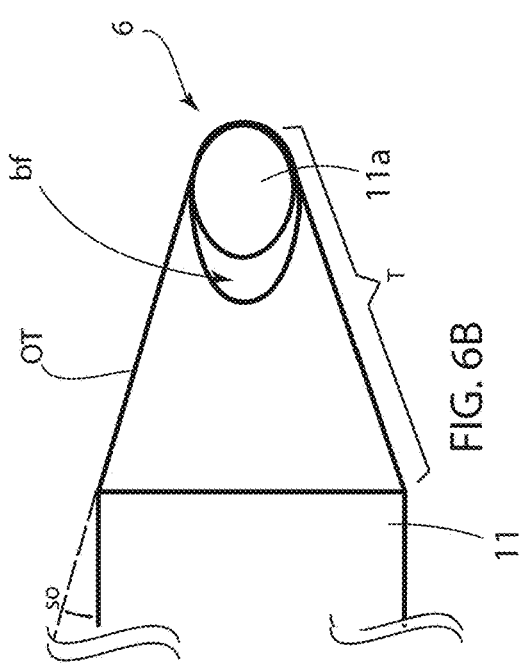
FIG. 6B depicts a top view of the outlet and tubular emitter tip shown in FIG. 6A.
Figure 6E:
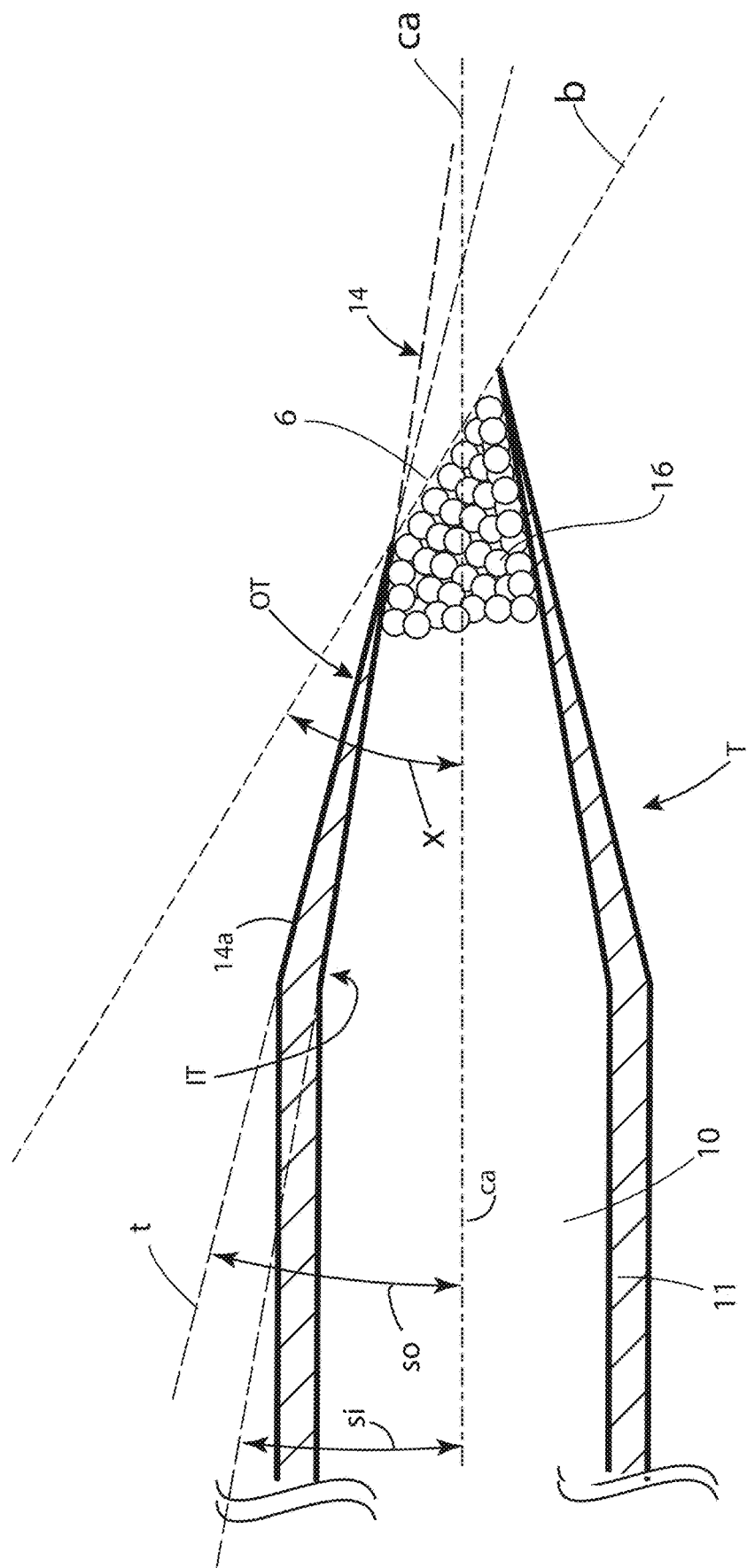
FIG. 6E depicts in a perspective view of part of a tubular emitter and its tip according to a preferred embodiment of the invention, which includes a frit within its outlet.

FIG. 6E shows alternate views of the second preferred embodiment of FIGS. 6C, 6D in which a frit element 16 is present internally within the tip T adjacent to the outlet 6.

Figure 6F:
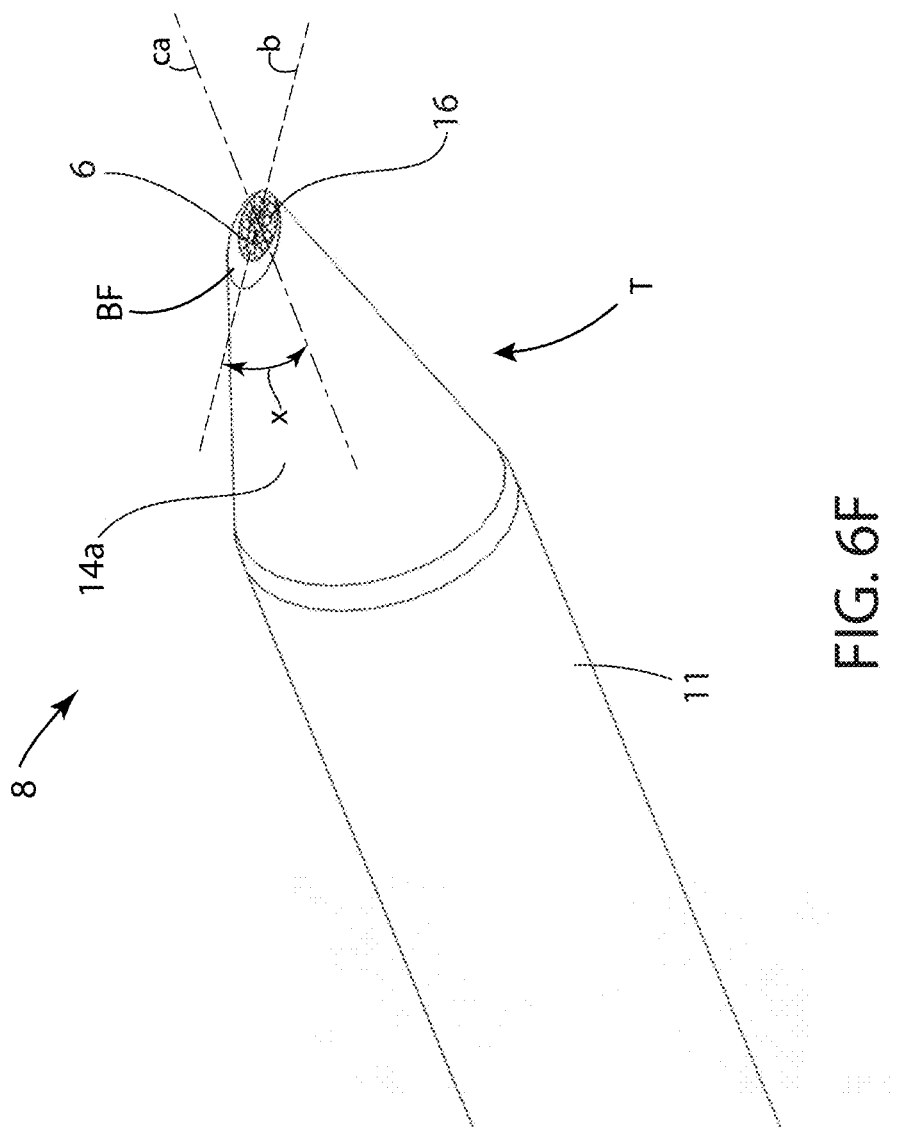
FIG. 6F depicts in a perspective view of part of a tubular emitter and its tip according to a preferred embodiment of the invention, which includes a frit within its outlet.

FIG. 6F shows alternate views of the second preferred embodiment of FIGS. 6A, 6B in which a frit element 16 is present internally within the tip T adjacent to the outlet 6.

In both of these figures, the position and dimensions of the outlet 6 are more clearly depicted. As can be appreciate particularly from the view presented in FIG. 6E, the outlet 6 is essentially a planar angled transection of a part of the proximal end of the tubular emitter 11 at the tip T. In the view, the plane of the outlet 6 is perpendicular, thus appears as a line or bevel "b", as it is perpendicular to the central axis and in one direction the central axis ca at an acute angle "x"; see FIG. 6E. Thus the geometry of the opening 6 is non-circular when viewed along the central axis "ca" and is preferably elliptical, as the angle "x" is necessarily less than 90 degrees of arc. Other non-circular opening 6 may also be used to define the opening 6 at a tip T, although not necessarily depicted in the drawings; such a non-circular opening 6 may be formed by the intersection of a plane angled with respect to a central axis ca of a bore 10 which is other than cylindrical in cross section as it extends through the tubular emitter 11. Thus the intersection of the outlet 6 transverse to the central axis ca is not perpendicular thereto at all degrees of rotation of the tubular emitter 11 at the tip T, as is illustrated in FIGS. 1A, 1B and FIG. 2., which would result in an outlet having circular cross-section with its peripherally equally radially spaced apart from the central axis ca, viz., concentric about the central axis ca. Rather the angled disposition "x" in emitter devices 1 of the present invention have been surprisingly found to provide unforeseen performance characteristics unknown previously. To provide such benefits, advantageously the angle "x" has a value of from 5 to 80 degrees, more preferably from 5 to 45 degrees, still more preferably from 10 to 30 degrees and especially preferably from 10 to 20 degrees. These unforeseen performance characteristics unknown previously are improved by the inclusion of a frit 16 within the tip T of a tubular emitter 11, as is depicted in various figures, and in particularly in FIGS. 6E and 6F.

FIG. 6F shows a perspective view of the preferred embodiment in FIGS. 6A, 6B containing a frit element 16. As noted previously, the tip T of FIGS. 6A, 6B did not include an inner taper and the id of the tubular emitter 11 extended through the tip T. Adjacent to a part of the periphery of the opening 6, there is also present a flat surface, a bevel face bf which is present at the intersection of the outlet 6 at an angle x relative to the central axis ca. This bevel face bf is also illustrated in the cross-sectional view of FIG. 6A, and the top plan view of FIG. 6B.

In the depictions of FIGS. 6A, 6B, 6C and 6D no frit (16) is illustrated in the figures, but such may also be present, as is illustrated in FIGS. 6E and 6F. Similarly, in the depictions of FIGS. 6A, 6B, 6C and 6D, no hydrophobic coating is illustrated in the these figures, but such may also be present in either the absence or presence of a frit 16.

Should the outer surface 14a of the conical tapered point 14 be a curved surface rather than a straight cone, (c.f., FIGS. 8A, 8B) the line "t" is taken as the tangent to the surface 14a at the perimeter of the outlet 6. It is to be understood that while the depiction of FIG. 6E is discussed with reference to FIG. 3B as both depict an embodiment with porous frit 16, the foregoing discussion is equally applicable to the nozzle-like outlet 6 of FIGS. 3A and 3C, as well as FIG. 2.

In the preferred embodiment according to FIG. 3B, the tapered proximal end 6 of the emitter 11 is further provided with a liquid-porous (but yet solid) frit 16 at the proximal end and a planar bevel that intersects both the frit 16 and taper 14. The frit 16 is typically made from particles (preferably adherent) having a mean diameter less than one-half the inside diameter id of the tubular emitter 11 at its outlet 6. To provide the frit 16, there may be used conventional techniques, i.e., thermal sintering, chemical precipitation, mechanical stuffing, etc. and using a variety of suitable materials, i.e., metals, polymers, glass, silica, to form a suitable frit 16 in this part of the tubular emitter 11. Such techniques include those known to skilled artisans in liquid chromatography column fabrication, for example as taught by one or more of U.S. Pat. Nos. 4,483,773, 4,793, 920 or 5,997,746, the contents of which are herein incorporated by reference.

Figure 5:
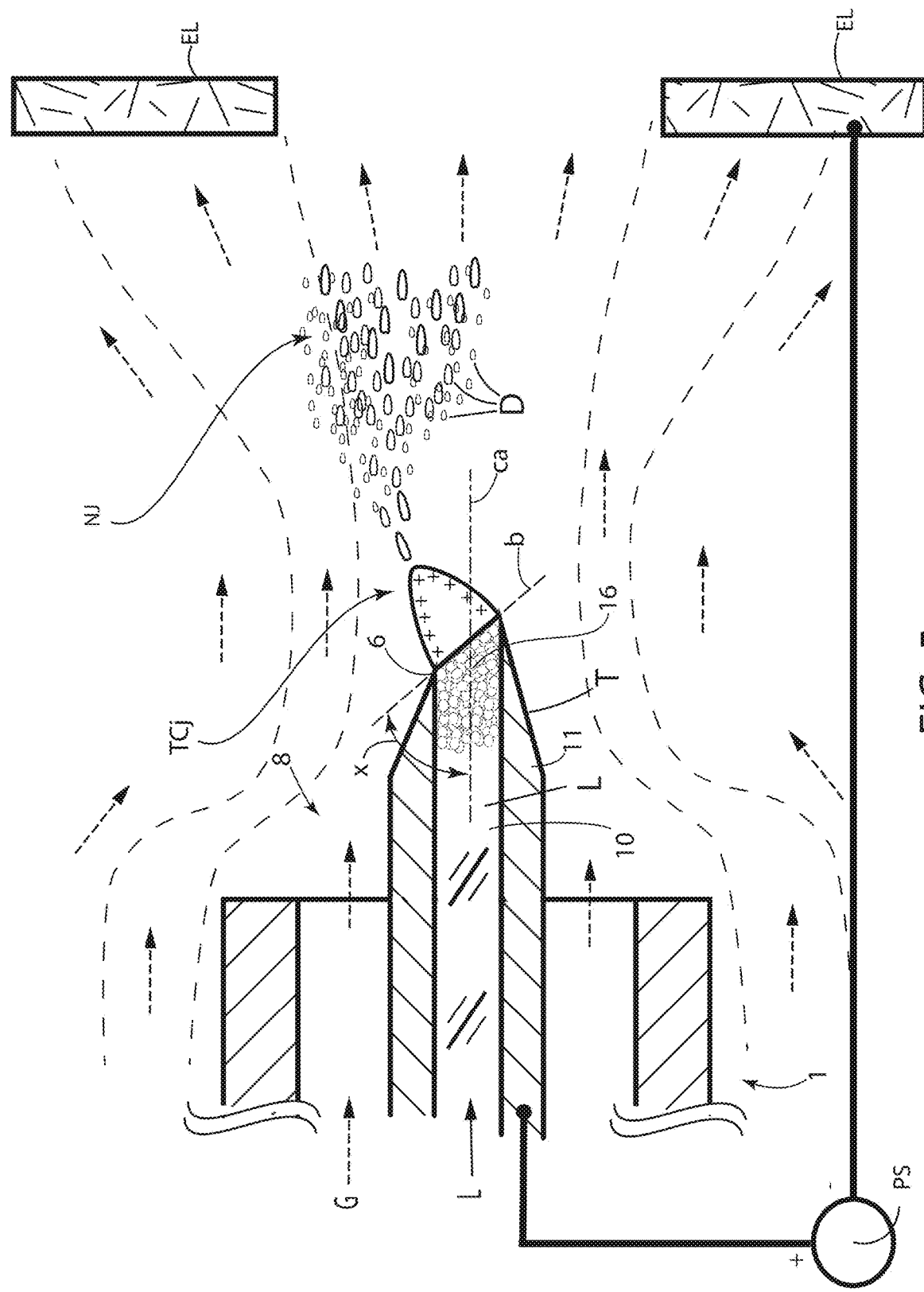
FIG. 5 depicts a detail of the tubular emitter according to FIG. 3B.

In one preferred embodiment, as seen in FIG. 5, the frit 16 is made from solid fused-silica spheres having a mean diameter of 5 μm and thermally sintered in place. This creates a frit 16 with a porosity of approximately less than 1 μm. The frit 16 typically has a minimum overall length inside the tube of at least the radius of the tube, and preferably equal to or greater than the diameter of the tube. The liquid within the bore 10 will readily pass through this solid particle frit 16. Suitable frits 16 may also be fabricated from inherently porous materials such as porous fused-silica particles or porous polymer particles or chemically porous monolithic materials.

In preferred embodiments, the outlet 6 of the tubular emitter 11 is a nozzle-like opening which transects the bore 10 at a bevel angle "x" preferably between 5 to 80 degrees, more preferably between 5 and 45 degrees, and particularly preferably between 10 and 30 degrees with respect to the central axis "ca" with respect to the central axis of the tubular emitter 11. The bevel angle x may be established as the angle between the central axis ca and the plane of the opening 6 as it traverses the central axis ca, where it is perpendicular to the central axis ca as is represented in FIG. 6E and in other figures, including FIGS. 6A, 6C, 8A and 8B. Optionally, but also very preferably, the tubular emitter 11 also comprises a frit 16 at or near outlet 6. Such a frit may be included in any embodiment of an emitter 1 of the present invention, including embodiments disclosed in FIG. 3A and FIG. 3C, particularly the latter. Further, optionally but preferably, the tip T also comprises a hydrophobic coating.

In another of preferred embodiments, as is depicted on FIG. 3C, the outlet 6 of the tubular emitter 11 is a nozzle-like opening which transects the bore 10 at a bevel angle 'x' preferably between 5 to 45 degrees with respect to the central axis of the tubular emitter 11, and which comprises a hydrophobic coating "hc" at or near outlet 6 and on the exterior surface of the proximal end 8 of the tubular emitter 11. Such a hydrophobic coating hc at or near outlet 6 and on the exterior surface of tip T at the proximal end 8 of the tubular emitter 11 may be included in any embodiment of an emitter 1 of the present invention. The hydrophobic coating has the property of changing the contact angle of the liquid exiting outlet 6 with the tapered surface 14.

Suitable hydrophobic coatings are known to those skilled in the art of electrospray emitters such as U.S. Pat. No. 7,186,974, the contents of which are herein incorporated by reference. Such hydrophobic coatings coming into consideration include "low surface energy" coating materials, which can be defined as those having an energy content of a solid surface (equivalent to the surface tension of a liquid) of not more than 20 mN/m, preferably 5 to 20 mN/m, more preferably 6 to 12 mN/m. The materials with low surface energy, which can be used in the present invention, are not specifically limited as far as they have suitable low surface energy, and can be coated on the emitter body without impairing its performance. Suitable materials with low surface energy include, for example, a fluoropolymer and fluorinated compound. Non-limiting examples of such include perfluoropolyoxetane, perfluorourethane, fluoropolymer elastomers, polytetrafluoroethylene, fluoroalkyl monosilane, polymeric perfluoroether di- and poly-silane, and perfluorooctal and perfluoropolyether with an epoxy, hydroxy, acrylate or isocyanate functional group. A preferred such material is perfluoropolyoxetane (PFPO), as it usually has a critical surface tension of 12 mN/m at room temperature making it particularly suitable in many applications.

When applied to a tapered surface 14 and outlet 6, the coating and frit 16, has the surprising effect as to redirect the Taylor Cone jet ("TCj") angularly emitted away from the central axis ca of the tubular emitter 11. Such is schematically depicted on FIG. 5.

With particular reference to FIGS. 3A, 3B and 3C, as well as FIG. 12, in use, the tubular emitter 11 is located at least partially inside, and preferably concentric to, a second tube 20 also having a proximal end 22 and distal end 24. The proximal end 8 and outlet 6 of the tubular emitter 11 is aligned towards the proximal end 22 of the second tube 20. This second tube 20 is a sheath-gas tube. The inside diameter id2 of the second tube 20 (optionally which may be tapered toward its proximal end 24, or may be non-tapered as shown in FIGS. 3A, 3B, 3C) is greater than the outside diameter od of the tubular emitter 11 at least at the proximal end 8 of the tubular emitter 11. The inner diameter id2 of the second tube 20 is typically within 0.1 to 2 mm greater than the outside diameter of the tubular emitter 11. The proximal end 8 of the tubular emitter 11 is preferably configured to protrude or extend beyond the proximal end 24 of the second tube 20. The protrusion distance is typically between 0.1 mm to 5 mm; preferably between 0.1 to 1 mm; and more preferably between 0.5 to 1 mm. To the distal end 22 of the second tube 20 is provided a pressurized flow of a gas "G"; such can be provided by an suitable means, such as through a suitable coupling, such as a manifold connection (see FIG. 12), which allows the distal end of the tubular emitter 11 to be in fluid communication with a liquid delivery system providing a material (i.e, analyte) to be analyzed, while the distal end 22 of the second tube 20 is only in communication with a source of pressurized gas GS. Pressurized gas, which can be unpressurized, i.e., 0 psi or which can be pressurized, typically not in excess of 500 psi, preferably not in excess of 200 psi, and particularly preferably not in excess of 100 psi, can flow through the space 25 between the tubular emitter 11 and second tube 20. Non-limiting examples of such a gas G includes ambient air, purified air, nitrogen, argon, oxygen, sulfur hexafluoride. The mass flow rate of the gas G typically is in the range of 0 to 10 L/min, preferably in the range of 0.05 to 2 L/min, and more preferably in the range of 0.5 to 1 L/min. The gas G may be flowing in the so-called laminar, or under turbulent flow conditions. The gas G exits via a proximal end outlet 26 of the sheath gas tube 20 and has an approximate flow cross section that is of a parabolic/conical shape. The highest velocity gas is known to be near the edge of the parabolic cone since the tubular emitter 11 causes a lower velocity component (i.e., the emitter is a drag on gas flow) of gas on the secondary tube axis; such a drag effect is depicted in FIG. 2 in which the depicted tip T and its circular opening 6 is according to the prior art and lacks at least the angled configuration and/or flat bevel features described with reference to the instant invention. Such may be contrasted with the depiction of FIG. 5 which illustrates a tip T of an emitter device 1 according to the invention in operation, wherein it seen that the Taylor Cone jet ("TCj") angularly emitted away from the central axis ca of the tubular emitter 11. As thereon depicted, the generally conical body of charged liquid present at the outlet 6 and extending outwardly therefrom and prior to being dispersed as droplets is angled away from, that is to say, is not concentric with the central axis ca. While operating, in an embodiment, a liquid is pumped (i.e., from a liquid source LS) from the inlet 2 at the distal end 4 towards the outlet 6 at region of the proximal end 8 of the tubular emitter 11 it encounters the porous frit 16. The frit 16 disrupts the flow velocity of liquid L within the bore 10. At liquid preferred flow rates (1 to 50 μl/min) within the bore 10 and which preferred materials passing through the bore 10, i.e., chemical compositions (aqueous/organic preferred as used in gradient elution "LC") of liquid, fluid flow is typically non-turbulent and has a parabolic laminar flow profile inside the bore 10.

Figure 8A:
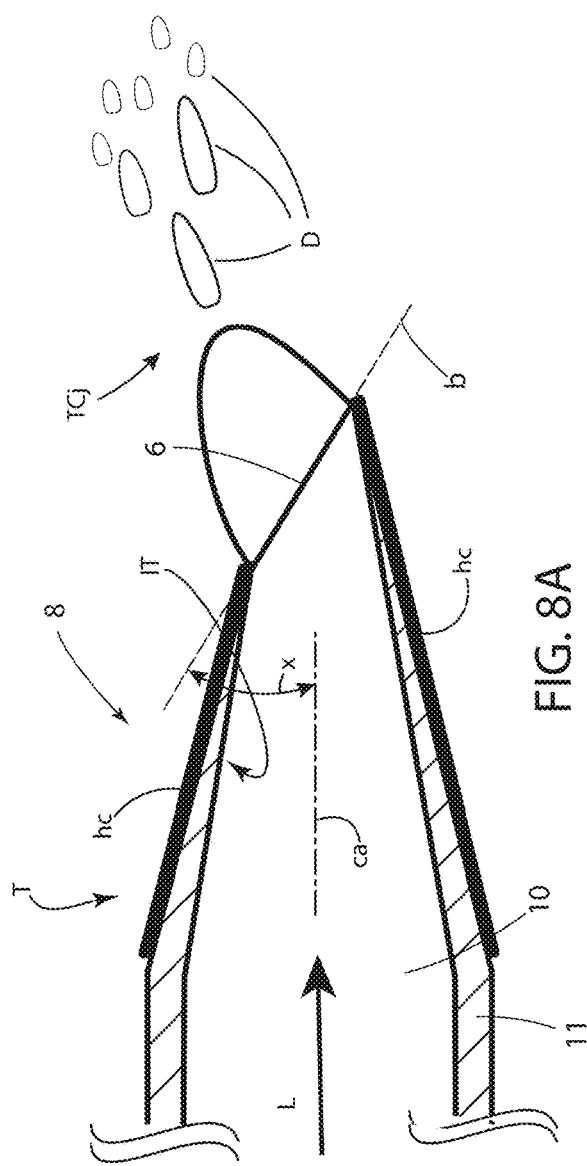
FIG. 8A depicts the dominant spray mode of droplets exiting the tip of a non-fritted emitter from an emitter device according to the invention.
Figure 8B:
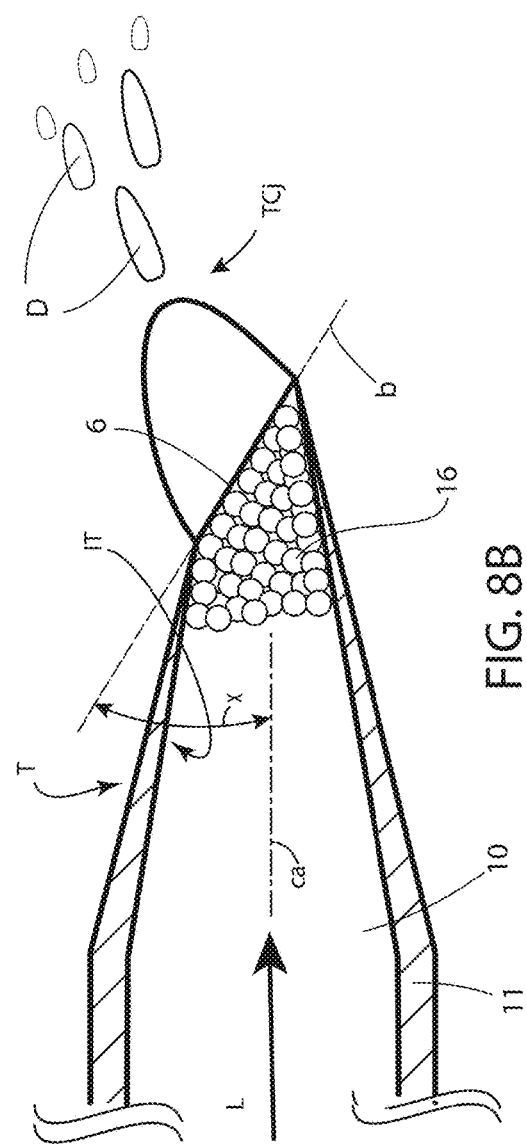
FIG. 8B depicts the dominant spray mode of droplets exiting the tip of a fritted emitter from an emitter device according to the invention.

Essentially, the bulk of the liquid has a velocity component along the central axis ca of the tubular emitter 11 flowing toward the proximal end, resulting in a Taylor Cone-jet "TCj" exiting parallel to the center axis ca of the tubular emitter, as is depicted on FIG. 8A. In FIG. 8A, which a hydrophobic coating hc at or near outlet 6 and on the exterior surface of tip T at the proximal end 8 of the tubular emitter 11, the dominant spray mode is a Taylor cone-jet that emits in the direction that is substantially at an angle asymmetric with respect to the central axis of the bore 10 of the tubular emitter 11. This redirection of the Taylor cone-jet and emitted droplets, even in the absence of a frit 16 is unexpected and at the same time remarkable. In FIG. 8B, which does not include a a hydrophobic coating hc at or near outlet 6 and on the exterior surface of tip T at the proximal end 8 of the tubular emitter 11, when the flowing liquid L reaches the frit 16, the flow direction is disturbed. Since the flow of liquid exiting frit 16 is not strictly along the central axis ca direction of the tubular emitter 11, the electric field and surface tension can enable a Taylor Cone jet of liquid that is asymmetric with respect to the central axis ca; such an effect is depicted on FIGS. 8A, 8B, 9A, and 9B. FIG. 8B shows the further surprising effect of adding a porous frit with redirection of the Taylor cone-jet, and droplet plume, is substantially at an angle asymmetric with respect to the central axis of the bore 10 of the tubular emitter 11. It is of course to be understood that a further, particularly preferred embodiment of a tubular emitter would include both the hydrophobic coating hc at or near outlet 6 and on the exterior surface of tip T at the proximal end 8 of the tubular emitter 11 (as in FIG. 8A) as well as the frit 16 (as in FIG. 8B).

Thus, charged droplets "D" generated traveling within the high electric field in part provided by the charged electrode (s) "EL" connected to the power supply "PS" downstream of but proximate to the tubular emitter 11, can experience the high velocity gas present near the edge of the sheath gas profile; such may also be referred to as the nebulizer jet "NJ".

A counter-electrode EL in the vicinity of the proximal end 8 of the tubular emitter 11 is required to maintain stable ESI conditions. The liquid passing through the bore 10 of the tubular emitter 11 may be either positively or negatively charged; the counter-electrode EL will have the opposite electrical charge. When the liquid L exits the tubular emitter 11 and its outlet 6, the high voltage applied to the liquid creates an electric field gradient between the tubular emitter 11 and a counter electrode. Said counter-electrode EL is an electrically conductive material typically held at an electrical potential close to ground potential so that the voltage difference between the tubular emitter 11 or emitter 11 and electrode is great enough to form a transient, or intransient, electrospray atomization and ionization. The voltage difference is typically between 1 and 5 kilovolts. This counter-electrode is typically at a distance of no less than 5 cm from the tubular emitter 11 proximal end 8; preferably at a distance of less than 1 cm and more preferably within a distance of 3 mm of this distance. To those skilled the art of LC-MS, the counter-electrode is typically the inlet system of an API-MS. It is to be understood that the voltages between the tubular emitter 11 or emitter 11 and counter electrode may be reversed without effecting operation. That is, the emitter may be held close to ground potential while the counter-electrode is at a high voltage. Voltages may be negative or positive with respect to ground, to generate ion polarity that is either negative or positive.

The high velocity gas and resulting shearing force on the charged droplets D enables smaller and faster secondary droplet formation. This approach to droplet formation leads to a higher surface area of liquid per unit mass passing outwardly from the tubular emitter, improved solvent drying, and ultimately improved ionization—all technical features of importance for downstream mass spectrometry. Such is demonstrated by the results reported on FIGS. 10A, 10B, 10C, 10D, 11A, 11B, 11C and 11D. As can be realized therefrom operating characteristics of the emitter 1, and the geometry of the outlet 6 of the tubular emitter 11, including the angled disposition and preferably also the presence of the frits 16 enhances the rapid breakup of fluid (i.e., liquid) exiting the bore 10 into a particularly good distribution of particularly small droplets, than could be expected to be achieved by devices according to the prior art.

Figure 9B:
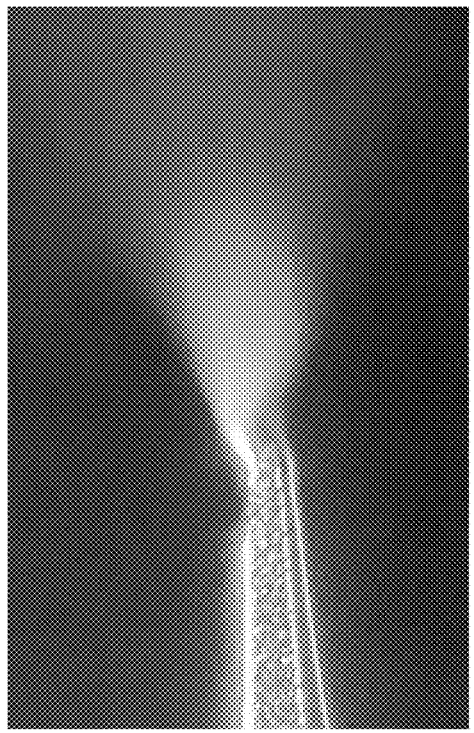
FIG. 9B is a photograph, in reflected light, of the dominant and asymmetrical spray mode of an emitter device according to FIG. 3B.
Figure 9D:
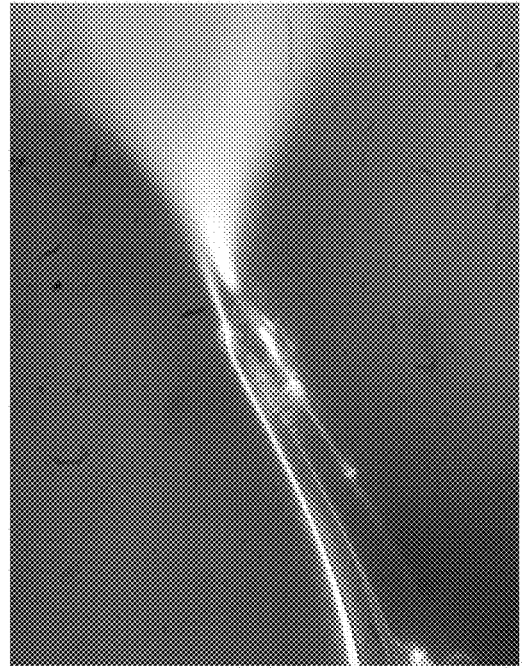
FIG. 9D is a photograph, in reflected light, of the dominant and asymmetrical spray mode of an emitter device according to FIG. 7A.
Figure 9A:
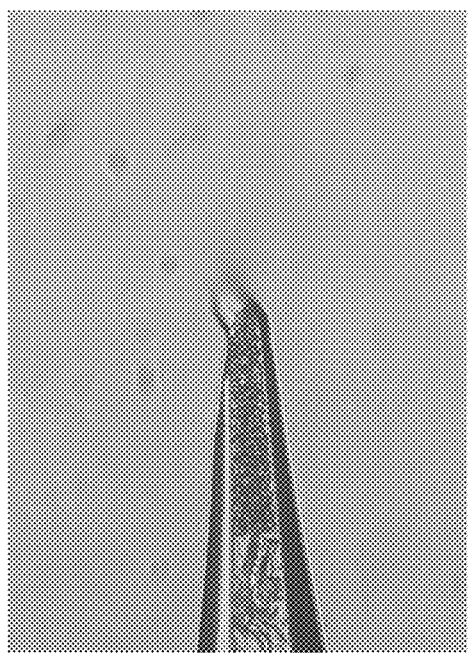
FIG. 9A is a photograph, in transmitted light, of the dominant and asymmetrical spray mode of an emitter device according to FIG. 3B.

Another preferred embodiment for the emitter 1 which is similar in many respects to what has already been discussed is to additionally provide a micro bend region "Z" tapered within the proximal part 8 and tip T near the outlet 6; such is depicted in FIGS. 7A and 7B. The micro-bend region Z—where the part of the tubular emitter 11 is no longer concentric with the central axis ca of the inner bore 10—has a radius of curvature which is close to the diameter of the tubular emitter 11, preferably the radius is in the range of 0.1 mm to 0.5 mm and the micro-bend region Z is present within the proximal part 8 and tip T which extends beyond the second tube 20. Preferably the radius or curvature is such that it present to the Taylor Cone spanning the outlet 6 is at an asymmetric angle to the direction of sheath gas flow, such that the micro-bend is small enough so that the end of the emitter is clear of the flow "shadow" of the sheath gas. More specifically the outlet 6 is positioned within the flow of gas G, preferably at a point within the inner diameter of if sheath gas tube 20. Much like the frit/bevel combination discussed particularly with reference to FIGS. 3B and 5, the bent taper at the tip T results in an asymmetric presentation of the Taylor Cone-jet to the sheath gas nebulizer jet exiting the second tube 20, as is seen in FIG. 9D. Combinations of the two embodiments are also possible and can lead to further improvements in performance; as is seen in FIG. 7B, both a micro-bend region 7 is provided in the proximal end part 8 and tip T of the tubular emitter 11, and the nozzle-like, specially shaped and tapered outlet 6 includes a beveled face bf. Also, notably, while the embodiment shown in FIG. 7A lacks the nozzle-like, specially shaped and tapered outlet 6 includes a beveled face bf, there is present the micro-bend region 7 is provided in the proximal end part 8 of the tubular emitter 11 which may also provide an advantageous spray pattern of liquid droplets. The result of these embodiments from FIG. 7A, 7B is to provide operating characteristics and a spray pattern that are substantially similar to that provided by the embodiment of FIG. 6E. That is the Taylor con-jet is directed in an asymmetric fashion, and at an acute angle, with respect to the sheath gas flow G Spray characteristics and droplet patterns delivered using certain preferred embodiments of the invention are illustrated in FIGS. 9A, 9B, 9C and 9D. FIGS. 9A and 9B show, respectively in transmitted light and reflected light, the dominant and asymmetrical spray mode for an emitter according to FIG. 3B. FIG. 9A and FIG. 9B illustrates a 20 um Tapered, Beveled, and Fritted tubular emitter 11 fabricated from 360 μm od, 75 μm id fused silica tubing, and having an ultimate configuration as illustrated in FIG. 3B. The emitter was fabricated from a 20 cm length of 360 μm OD, 75 μm ID fused-silica tubing. One end of the tube was tapered to a 20 μm ID using a commercially available laser puller (i.e., Sutter Instruments model P-2000), then (as in FIG. 6E) was beveled and polished with a flat b, at an angle x, of approx. 20 degrees. It was then fritted by filling the taper with 5 μm silica spheres.

Figure 9C:
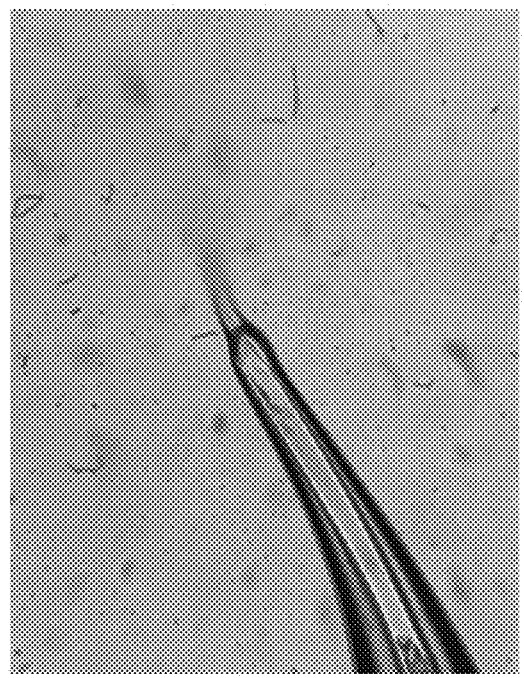
FIG. 9C is a photograph, in transmitted light, of the dominant and asymmetrical spray mode of an emitter device according to FIG. 7A.

FIGS. 9A and 9B show, respectively in transmitted light and reflected light, the dominant and asymmetrical spray mode for an emitter having a bevel and frit according to FIG. 3B. FIG. 9C and FIG. 9D illustrates an un-fritted fused-silica emitter having a micro-bend at its proximal end according to FIG. 7A.

To produce the photos of FIGS. 9A, 9B, 9C and 9D, the following parameters are relevant.

Figure 4:
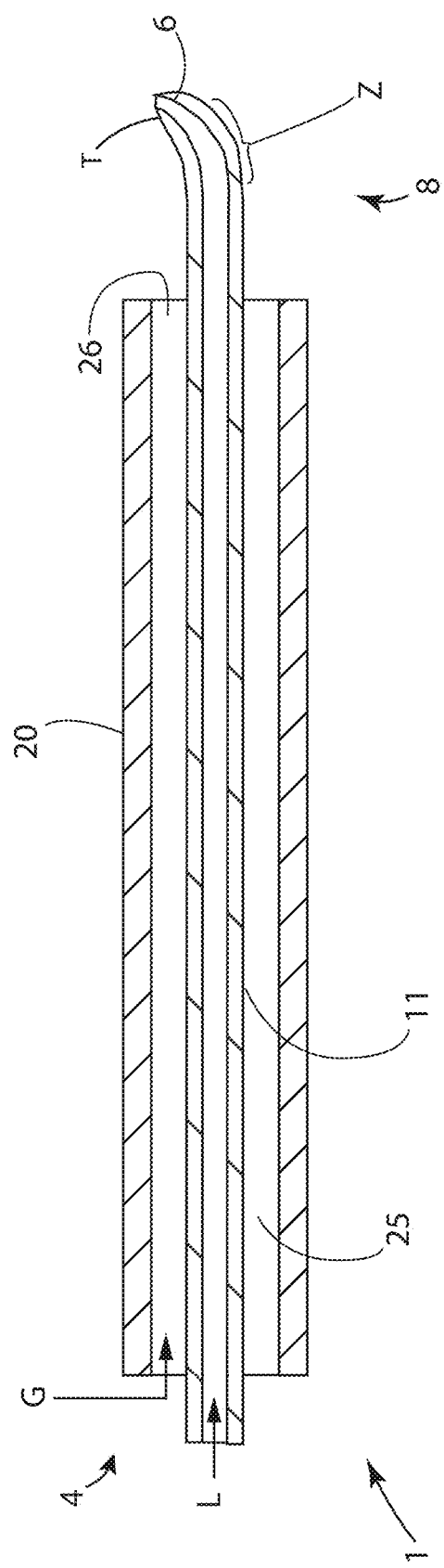
FIG. 4 depicts a yet further embodiment of an emitter device of the invention, which includes a microbend near the tip of its tubular emitter.

The liquid used was 2% acetonitrile (ACN with 0.1% formic acid added) at a pumped flow rate of 10 μl/min using a 250 μL syringe pump to deliver isocratic mobile phase. The applied voltage (applied directly to the liquid) was 3.9 kV and the sheath gas (nitrogen) flow pressure was 20 psi. The inner diameter of the sheath gas tube (not shown) was 0.020 inch. The outer diameter of the sheath gas tube was 1/16 inch. The distance the emitter protruded from the sheath gas nozzle was about 1 mm, the distance to the counter electrode (not shown, but see FIGS. 4, 5) was approx. 2 mm. The syringe pump was connected to the emitter using 360 μm OD fused-silica transfer tubing having an ID of 75 μm and a length of 50 cm. The connection between the transfer tube and 10 cm long emitter tube was made by a stainless-steel coupling union having an ID of 150 μm. The positive terminal from the high-voltage power supply was electrically connected to the coupling union. The negative terminal was electrically connected to the counter electrode. The emitter tube was passed through a steel "Tee" gas manifold to as to provide for the addition of coaxial sheath gas G through the second tube, similar in manner to that shown in FIG. 12. The manifold tee was gas-tight so that the gas pressure applied to the side-arm of the tee isolated the flow though the sheath gas tube. The length of the sheath gas tube was 1.5 cm. The entire apparatus assembled on a small (2 inch×3 inch; 5.1 cm×7.6 cm) plastic mounting plate (so as to isolate the high voltage), and was placed on the stage of an inverted light microscope, having both reflected (darkfield) light and transmitted-light (brightfield) illumination capabilities. Images during spray operation for both illumination modes were captured with a digital camera.

FIGS. 10A, 10B, 10C and 10D as well as 11A, 111B, 11C and 11D are representative full-scan MS spectra for the same mixture of 3 peptides (Angiotensin I, Angiotensin II, Neurotensin) and 2 small proteins (Insulin, Bovine Myoglobin) using continuous infusion for four different spray emitter, voltage, and sheath gas arrangements. Analyte concentration is 1 μM (micomolar) for each analyte in an aqueous solution containing 2% acetonitrile and 0.1% formic acid.

The prior art emitter of FIG. 1A was used to provide a comparative reference for optimized signal. A 2 μm ID, platinum metal coated, nano-ESI emitter made from 1.2 mm od×0.69 mm id borosilicate glass tubing (New Objective part number BG-12-69-2-CE-20) was mounted on a commercial nano-ESI source (New Objective Inc model DPV-500) that was in turn mounted on the commercial mass spectrometer (ThermoFisher model LTQ). The nano-ESI source provides electrical contact to the metal coating on the outside of the emitter from the ESI power supply (+2 kV) from the mass spectrometer (ThermoFisher model LTQ). The outlet of the nano-ESI emitter was approx. 1.5 mm away, and on-axis, from the inlet of the mass spectrometer. 5 uL of sample, as described above, was directly loaded by pipette (Eppendorf) into the interior bore of the nanospray emitter. Data was collected by the computer controlling the mass spectrometer.

Figure 10A:
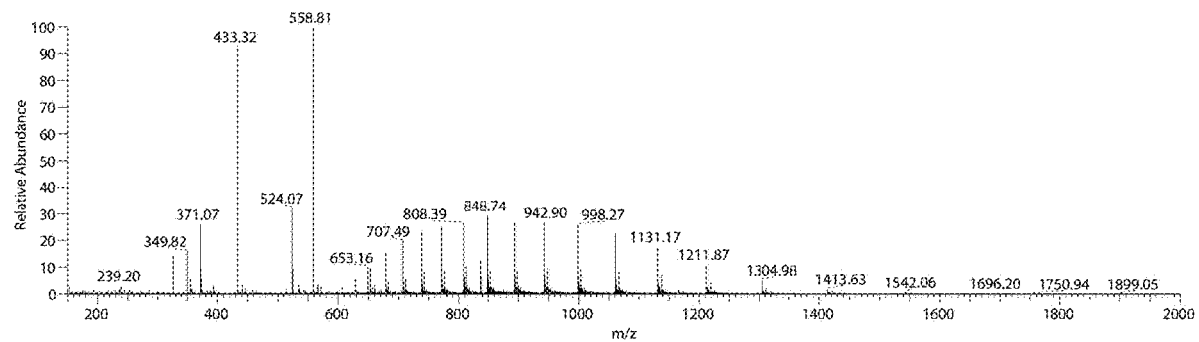
FIG. 10A depicts a full-scan MS spectra for an analyte which comprised a mixture of peptides and small proteins.
Figure 11A:
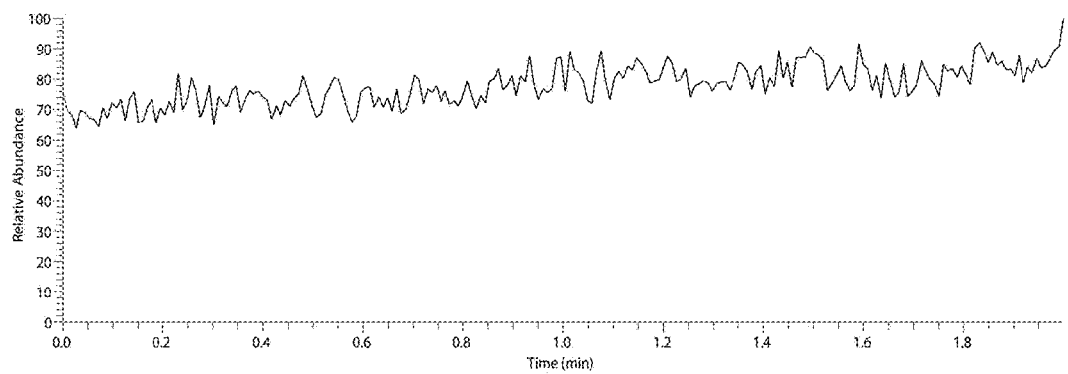
FIG. 11A depicts a full-scan MS spectra for an analyte which comprised a mixture of peptides and small proteins.

FIG. 10A illustrates the MS data collected using the described borosilicate glass nanospray apparatus. The emitter was essentially as illustrated in FIG. 1A. FIG. 11A illustrates representative Total Ion Current (TIC) traces for the same device, conditions and sample as used in FIG. 10A. $7.5 \times 10^6$ signal counts was observed with a relative standard deviation of 8% for the total ion current detected by the mass spectrometer over a range of 150 to 2,000 m/z.

Figure 10B:
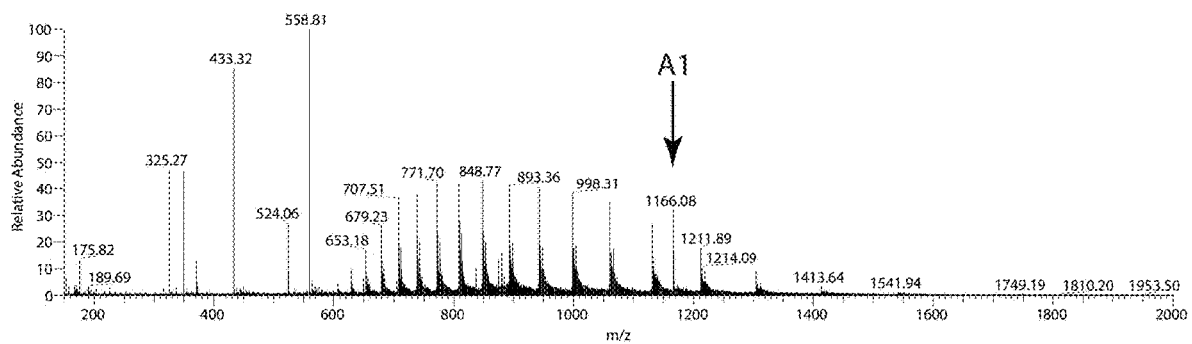
FIG. 10B-10D are full-scan MS spectra for an analyte which comprised a mixture of peptides and small proteins, at differing operating parameters of emitter devices according to the invention.

For examples using embodiments of the inventive apparatus (FIGS. 10B, 10C, 10D and 11B, 11C, 11D), the assembled spray apparatus on the plastic plate, described in the above paragraph for FIG. 9, was transferred from the light-microscope to a mating platform positioned near the inlet of a commercial ion-trap mass spectrometer (ThermoFisher model LTQ). The stand-alone high voltage power supply used for FIG. 9A was substituted by the ESI power supply (0 to 5 kV) delivered by the mass spectrometer. The positive output of the power supply was electrically connected to the metal coupling union. The negative end of the supply connects to the metal inlet of the mass spectrometer, which serves as the counter electrode. The outlet of the emitter was adjusted to be on axis so as to be 2 mm away from the inlet of the mass spectrometer. Nitrogen sheath gas was delivered at operating pressures ranging from 20 psi to 80 psi for the various emitter and data collection examples. The sample, as described above, for analysis was loaded into the 250 μL syringe and flow at 10 μL/min was established by the syringe pump. Data was acquired by the computer that controls the mass spectrometer. The inventive apparatus was mounted, as described above, and data obtained on the mass spectrometer with said tapered, fritted, and beveled emitter used in the acquisition of FIGS. 9A and 9B. FIG. 10B illustrates optimized signal (3.6E6 counts) for the tapered, beveled, and fritted 20 μm emitter at a pumped flow rate of 10 uL/min, a sheath gas flow of 20 psi (0.8 Liters/min), and applied voltage of 2.9 kV.

Figure 11B:
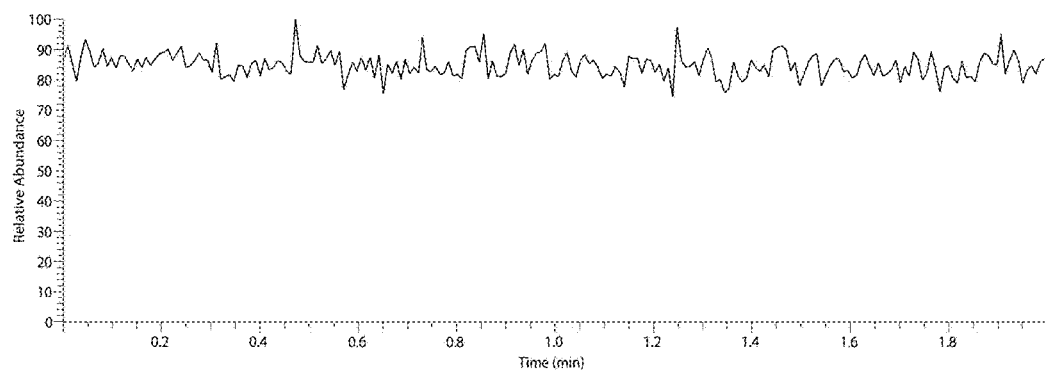
FIG. 11B-11D illustrate representative Total Ion Current (TIC) traces for a tested analyte sample composition.

FIG. 11B illustrates representative Total Ion Current (TIC) traces for the same device, conditions and sample as used in FIG. 10B. The emitter 11 was essentially as illustrated in FIG. 6E. The arrow 1A in FIG. 10B points to the molecular ion signal for Insulin, which was (surprisingly) not observed in the Nanospray data of FIG. 10A. This figure also illustrates the exceptional performance both in terms of signal intensity, with superior signal stability (a relative standard deviation (RSD) of 4%).

Figure 10C:
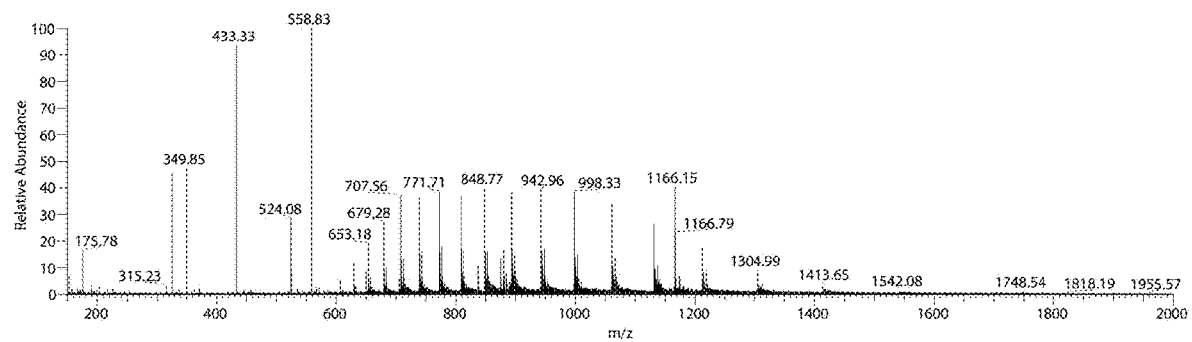
Figure 11C:
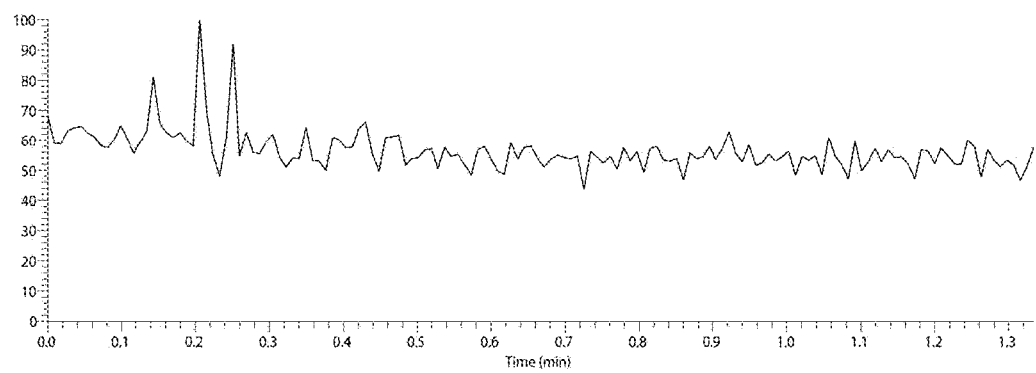

The inventive apparatus of the example from FIG. 10B was modified so that an emitter of identical geometry (OD, ID, Taper) but unfritted, was substituted in the spray assembly. Signal was again obtained on the same sample. FIG. 10C illustrates optimized signal (1.9E6 counts) for the tapered and beveled emitter fused silica emitter 20 μm ID (no frit), also at 10 uL/min, sheath gas of 60 psi (1.38 Liters/min), and applied voltage of 2.5 kV. FIG. 11C illustrates representative Total Ion Current (TIC) traces for the same device, conditions and sample as used in FIG. 10C. The emitter 11 included a tip T essentially as illustrated in FIG. 6A. Under the optimized conditions stated above, this unfritted emitter yielded only approx. one-half the signal counts and an (unfavorable) increase in the relative standard deviation to 7%.

Figure 10D:
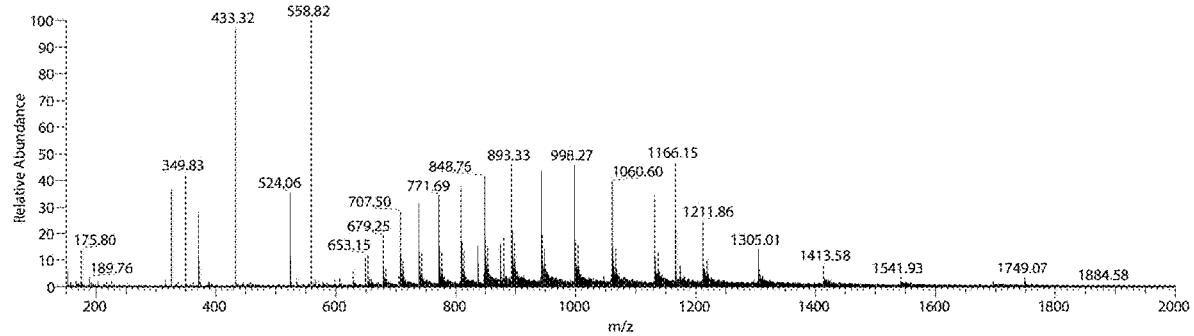
Figure 11D:
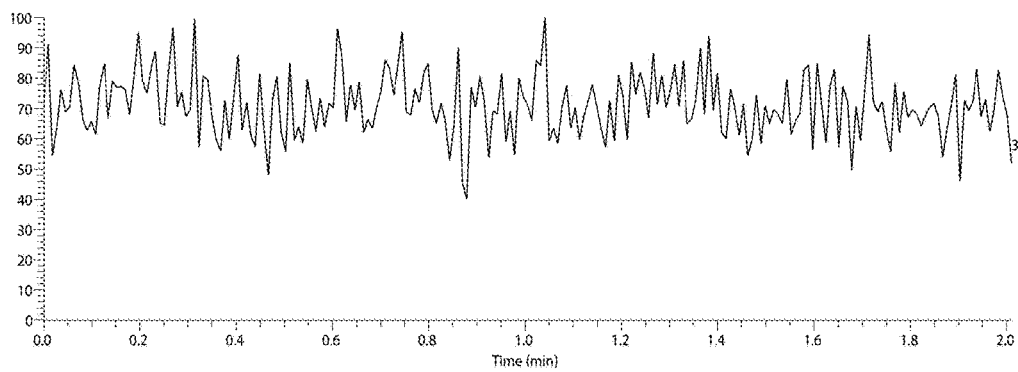

The inventive apparatus of the example from FIG. 10B was modified again so that a commercially available metal tube emitter (New Objective part number MT-360-50-5) was beveled and polished to have a substantially similar taper and bevel geometry to FIG. 3A, was substituted in the spray assembly. Signal was again obtained on the same sample. FIG. 10D illustrates optimized signal ($1.4 \times 10^6$ counts) for the tapered and beveled emitter made from stainless steel (50 μm ID) also at 10 uL/min, sheath gas 80 psi (1.57 Liters/min), 2.0 kV applied voltage. FIG. 11D illustrates representative Total Ion Current (TIC) traces for the same device, conditions and sample as used in FIG. 10D. The emitter 11 included a tip T essentially as illustrated in FIG. 6A. Under the optimized conditions stated above, this metal body unfritted-emitter yielded only approx. 40% the signal counts compared to the best case embodiment along with an (unfavorable) increase in the relative standard deviation to 12%. Use of the preferred embodiments make possible a highly optimized LC-MS process. One example process is schematically shown in FIG. 12, resulted in the high-quality chromatograms shown in FIG. 13A and FIG. 13B.

FIG. 12. schematically depicts the U1 combined LC system/autosampler U1 (Sciex Eksigent Nano Ultra) which delivered a linear gradient of acetonitrile (ACN) at a composition from 2% to 35% (Also present in the mobile phase is a constant concentration of 0.1% formic acid (FA).) over a 10 minute duration and flow rate of 3 ul/min. The liquid output from U1 was connected via 50 μm id fused-silica tubing connected to the electrically conductive connection union CCU to the bore 10 of an emitter tube 11 of an emitter device 1 according to the invention. The emitter device 1 comprised a tubular emitter 11 having a tip T essentially as illustrated in FIG. 6E. Positive ESI high voltage (1 to 5 kV) was applied through the CCU, with a preferred range of 3 to 4.1 kV. During operation U1 injected a liquid sample (1 uL) (comprising an analyte) into bore 10 via the CCU. Sheath gas (nitrogen, 0 to 100 PSI with gas flow rates ranging from 0 to 1.7 Liters/min) was delivered from a gas source GS through a gas manifold GM and into a PEEK sheath gas tube (0.020 inch ID×1/16 inch OD; 0.05 cm ID×0.158 cm OD) which was concentric about the tubular emitter 11. The ESI voltage was 3.5 kV (nitrogen sheath gas at pressure of 20 psi and a flow rate of 0.8 L/min) in FIG. 13A, or 4.1 kV (no sheath gas) in FIG. 13B.

A packed LC column was integrated into the bore 10 of the tubular emitter 11, and had dimensions of 360 μm ID×150 μm ID×9.3 cm. Packing material was 2.7 μm HALO C18 (Applied Materials Technology corporation). The emitter 11 included a tip T essentially as illustrated in FIGS. 9A, 6E, 6F and had the following configuration: The emitter was fabricated from a 12 cm length of 360 μm od, 150 μm id fused-silica tubing. One end of the tube (the diameter "d" within the tip T just prior to the outlet 6) was tapered to 20 μm using a commercially available laser puller (Sutter Instruments model P-2000), then (as in FIG. 6E) was beveled and polished with a flat b, at an angle x, of approx. 20 degrees. It was then fritted by filling the taper with 5 μm silica spheres. The distance between the emitter and inlet "MSI" of the mass spectrometer unit "U2" (a Thermo Fisher Corporation model LTQ Mass Spectrometer) was approx. 2 mm; and the outlet 6 protruded beyond the proximal end 24 of the sheath gas tube 20 by approx. 1 mm. Both the proximal end 24 of the sheath gas tube 20 and the tip T and outlet 6 of the emitter tube 11 of an emitter device 1 were within a ionization chamber "IC", which extended to the MSI.

It is to be understood that while FIG. 12 illustrates an apparatus, system and method for optimized liquid chromatography-mass spectrometry which includes at least one of the inventive emitter devices 1 described herein, such illustrates only a non-limiting example of such and that the inventive emitter devices 1 may used with different apparatus, in different systems and operated according to or in conjunction with different methods not expressly disclosed herein.

FIGS. 13A and 13B illustrated reconstructed base peak chromatograms for the embodiment shown and described in FIG. 12. FIG. 13A illustrates the signal obtained for 4.1 kV applied voltage and no sheath gas (this is optimized signal for no sheath gas). FIG. 13B illustrates signal for 3.5 kV with optimized nitrogen sheath gas set at 20 PSI (0.8 Liters/min) at ambient temperature. The signal for FIG. 13B is improved both in terms of signal intensity and lowered baseline noise. In this specific example the addition of sheath gas improved signal intensity of FIG. 13B by a factor of approximately 50% (viz., $2.5\times10^7$ counts vs $3.8\times10^7$ counts) as compared to FIG. 13A, while also reducing the baseline noise by 50% (baseline TIC at 2.1% vs TIC of 1.1%), yielding an overall performance enhancement.

While the stated example uses a sheath gas at ambient temperature (approx. 20 deg. C., 68 deg. F.), as is known by those skilled in the art, the sheath gas may be preferably heated above ambient to improve the solvent drying capability of the gas.

The invention claimed is:

1. An emitter device configured to operate as part of an electrospray ionization mass spectrometry device, the emitter device comprising:

a tubular emitter having a central axis in at least a part of a bore thereof, an inlet at a distal end, and at a proximal, end a tip (T) having a nozzle-like or tapered outlet;

the tubular emitter being at least partially inside and preferably concentric to, a second tube having a proximal end and distal end, wherein at least the outlet extends outwardly from the second tube such that it is beyond the proximal end;

wherein:

when the tip of the tubular emitter is concentric with the central axis, the outlet is essentially planar at its transverse intersection of the tubular emitter wherein in at least one orientation it intersects the central axis at a perpendicular point thereof, and relative thereto the plane of the outlet and the central axis have an acute angle (x) of 5-80 degrees therebetween, and the tip comprises a porous frit internally within the tip adjacent to the outlet\, or, when the proximal end of the tubular emitter includes a micro bend region, the tip of the tubular emitter, the tip is non-concentric with the central axis and is radiused with respect thereto, wherein, during operation of the tubular emitter the dominant spray mode of droplets emitted from the outlet assumes the configuration of a Taylor cone-jet whose axis is substantially at an angle asymmetric with respect to the central axis of the tubular emitter, wherein the droplets enter the highest velocity region of nebulization gas emitted from between the tubular emitter and the second tube.

2. The emitter device of claim 1, wherein the acute angle (x) is between 5 and 45 degrees.

3. The emitter device of claim 1, wherein the frit is solid fused-silica spheres having a mean diameter of 5 μm and thermally sintered in place within the tip adjacent to the outlet.

4. The emitter device according to claim 1, wherein the emitter tube includes a hydrophobic coating at or near the outlet and on the exterior surface of the tip.

5. The emitter device of claim 4, therein the hydrophobic coating is a low surface energy coating material having an energy content of a solid surface (equivalent to the surface tension of a liquid) of not more than 20 mN/m.

6. The emitter of claim 1, wherein the bore comprises a packing material.

7. A method of analyzing an analyte comprised within a liquid in a mass spectrometry process, the method comprising the steps of:

providing the liquid and analyte to an emitter device according to claim 1;

operating the emitter device to form a plurality of electrically charged droplets containing the analytes to be analyzed;

evaporating at least a substantial part of the liquid;

thereafter providing the analytes to a mass spectrometry device for analysis.

8. The method of claim 7, wherein the orifice of the emitter tube of the emitter device operates at a volumetric flow rate of ≥1 microliters/minute (≥1 μl/min).

9. The emitter device of claim 1, wherein when the proximal end of the tubular emitter includes a micro bend, the tip is radiused with radius in the range of 0.1 mm to 0.5 mm.

10. The emitter device of claim 2, wherein the acute angle (x) is between 10 to 30 degrees.

11. The emitter device of claim 10, wherein the acute angle (x) is between 10 to 20 degrees.

12. The emitter device of claim 5, wherein the hydrophobic coating is a low surface energy coating material having an energy content of a solid surface (equivalent to the surface tension of a liquid) of 5 to 20 mN/m.

13. The emitter device of claim 12, wherein the hydrophobic coating is a low surface energy coating material having an energy content of a solid surface (equivalent to the surface tension of a liquid) of 6 to 12 mN/m.

* * * * *